(12) United States Patent
Azami

(10) Patent No.: US 11,290,665 B2
(45) Date of Patent: Mar. 29, 2022

(54) SOLID-STATE IMAGING DEVICE AND ELECTRONIC APPARATUS

(71) Applicant: SONY SEMICONDUCTOR SOLUTIONS CORPORATION, Kanagawa (JP)

(72) Inventor: Kenji Azami, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/756,188

(22) PCT Filed: Sep. 21, 2018

(86) PCT No.: PCT/JP2018/035176
§ 371 (c)(1),
(2) Date: Apr. 15, 2020

(87) PCT Pub. No.: WO2019/082568
PCT Pub. Date: May 2, 2019

(65) Prior Publication Data
US 2021/0195124 A1 Jun. 24, 2021

(30) Foreign Application Priority Data
Oct. 24, 2017 (JP) .............................. JP2017-204912

(51) Int. Cl.
*H04N 5/225* (2006.01)
*H04N 5/347* (2011.01)
(Continued)

(52) U.S. Cl.
CPC ........... *H04N 5/347* (2013.01); *H04N 5/3745* (2013.01); *H04N 9/045* (2013.01)

(58) Field of Classification Search
CPC .................... H04N 5/232122; H04N 5/35563
See application file for complete search history.

(56) References Cited

U.S. PATENT DOCUMENTS

2010/0328479 A1* 12/2010 Sambongi ......... H01L 27/14609
348/222.1
2013/0087875 A1* 4/2013 Kobayashi ........ H01L 27/14605
257/432
(Continued)

FOREIGN PATENT DOCUMENTS

CN 104718745 A 6/2015
CN 107408568 A 11/2017
(Continued)

OTHER PUBLICATIONS

International Search Report and Written Opinion of PCT Application No. PCT/JP2018/035176, dated Dec. 4, 2018, 10 pages of ISRWO.

*Primary Examiner* — Twyler L Haskins
*Assistant Examiner* — Dwight Alex C Tejano
(74) *Attorney, Agent, or Firm* — Chip Law Group

(57) ABSTRACT

There is provided a solid-state imaging device and an electronic apparatus that performs focus detection and image generation on objects of various shapes. A solid-state imaging device includes a pixel array in which multiple pixels are arrayed. The multiple pixels each receive light in a predetermined wavelength band. The pixel array includes at least one or more first pixels and at least one or more second pixels. The at least one or more first pixels each include a pair of sub-pixels provided beneath one microlens. The pair of sub-pixels is aligned in a first direction. The at least one or more second pixels each include a pair of sub-pixels provided beneath one microlens. The pair of sub-pixels is aligned in a second direction. The second direction is perpendicular to the first direction.

16 Claims, 15 Drawing Sheets

(51) Int. Cl.
*H04N 5/3745* (2011.01)
*H04N 9/04* (2006.01)

(56) References Cited

U.S. PATENT DOCUMENTS

| | | | |
|---|---|---|---|
| 2013/0194471 A1* | 8/2013 | Yamashita | H04N 5/374 348/308 |
| 2015/0070548 A1* | 3/2015 | Fukuda | H01L 27/14627 348/302 |
| 2015/0256778 A1 | 9/2015 | Kusaka | |
| 2017/0366769 A1* | 12/2017 | Mlinar | H01L 27/14603 |
| 2018/0269245 A1* | 9/2018 | Mlinar | H04N 9/04 |

FOREIGN PATENT DOCUMENTS

| | | |
|---|---|---|
| EP | 2903259 A1 | 8/2015 |
| JP | 2014-072541 A | 4/2014 |
| JP | 2015-162658 A | 9/2015 |
| WO | 2014/050875 A1 | 4/2014 |
| WO | 2016/111175 A1 | 7/2016 |
| WO | 2017/130723 A1 | 8/2017 |

\* cited by examiner

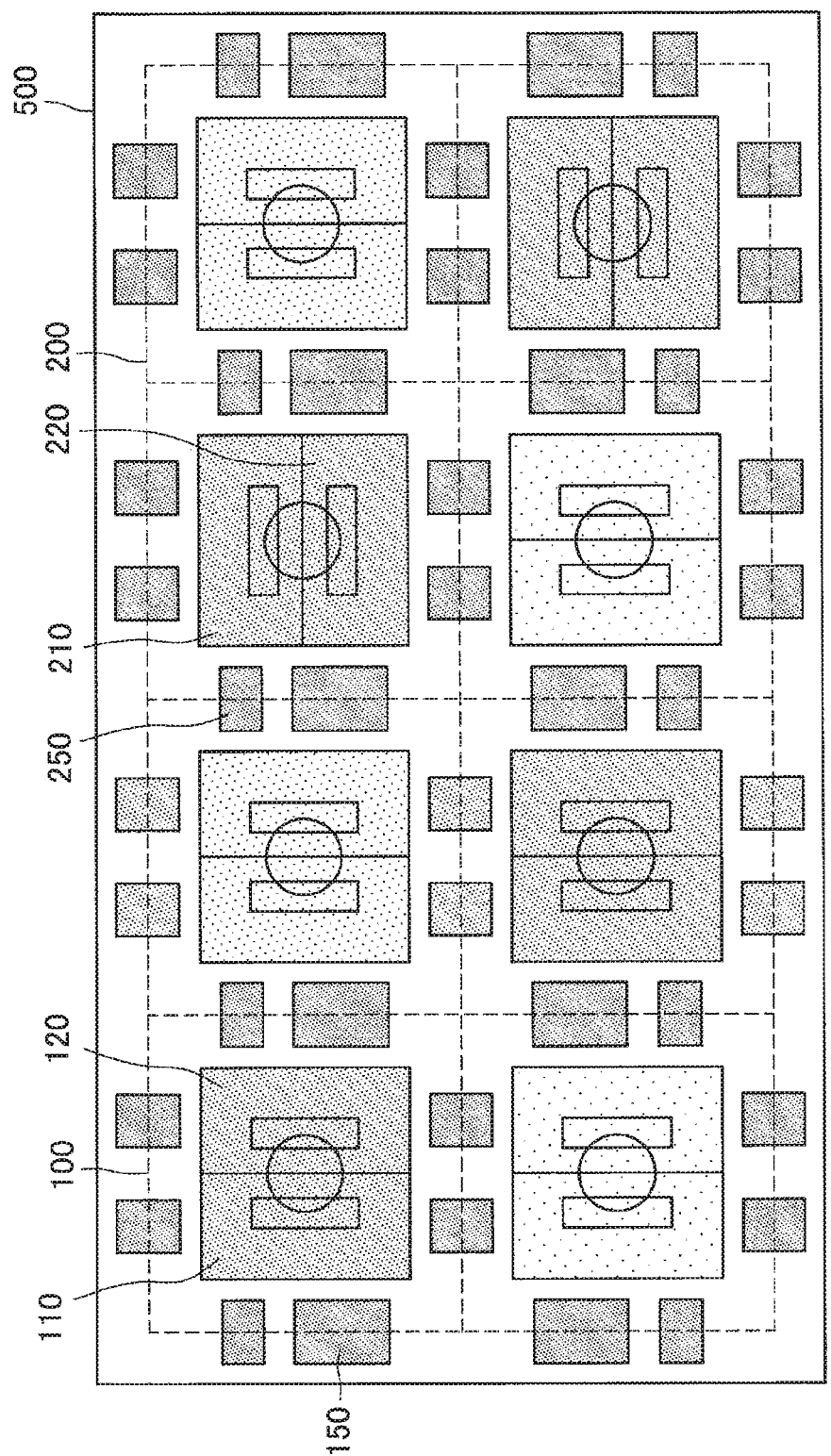
[FIG. 1]

[FIG. 2]
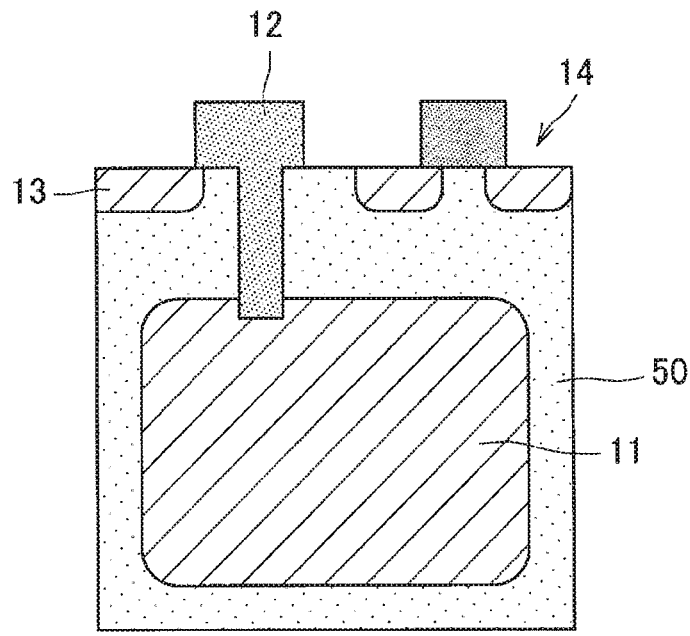
[FIG. 3A]
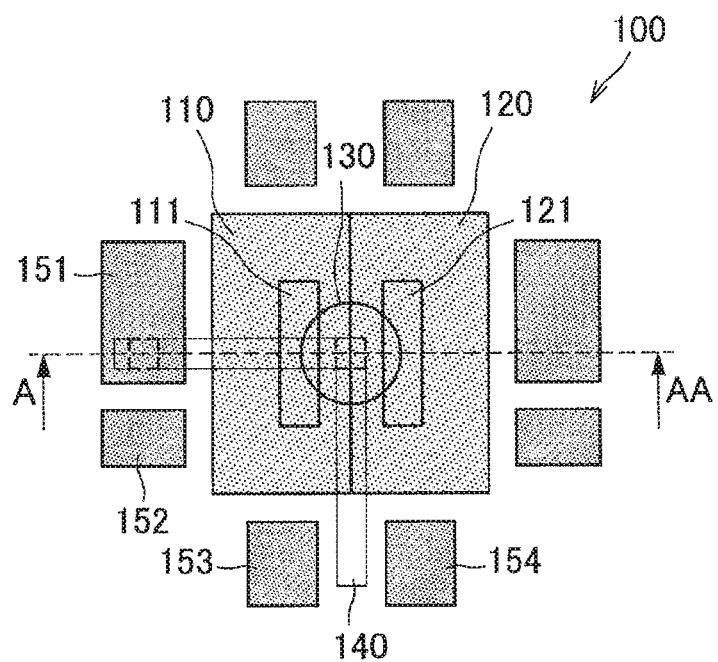

[FIG. 3B]
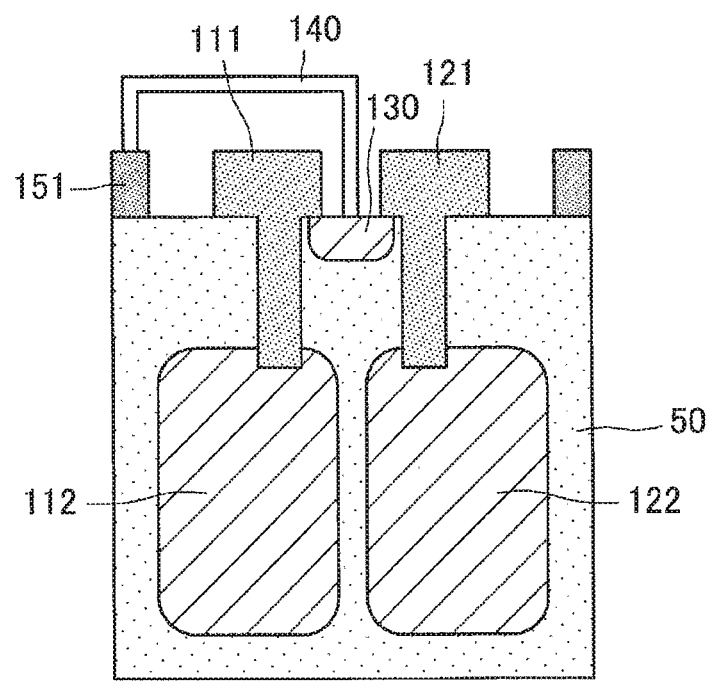
[FIG. 3C]
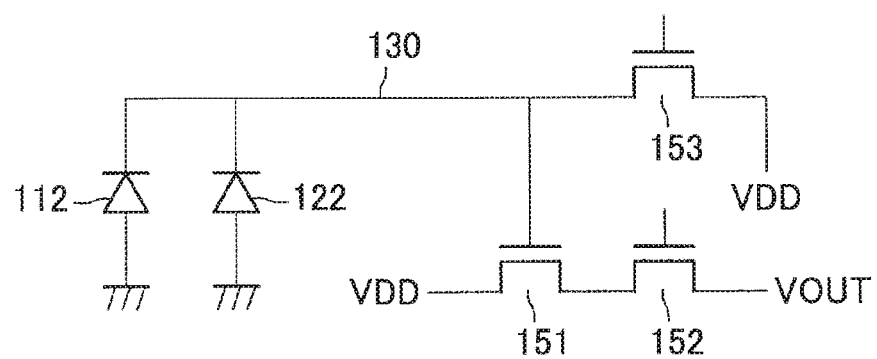

[FIG. 3D]
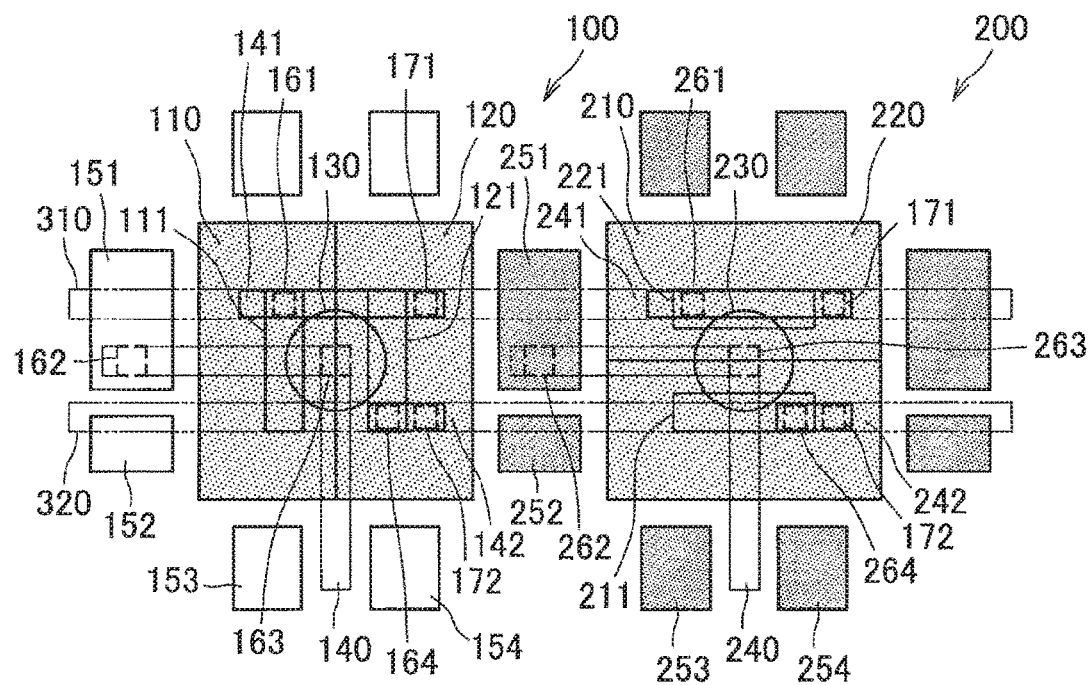
[FIG. 4]
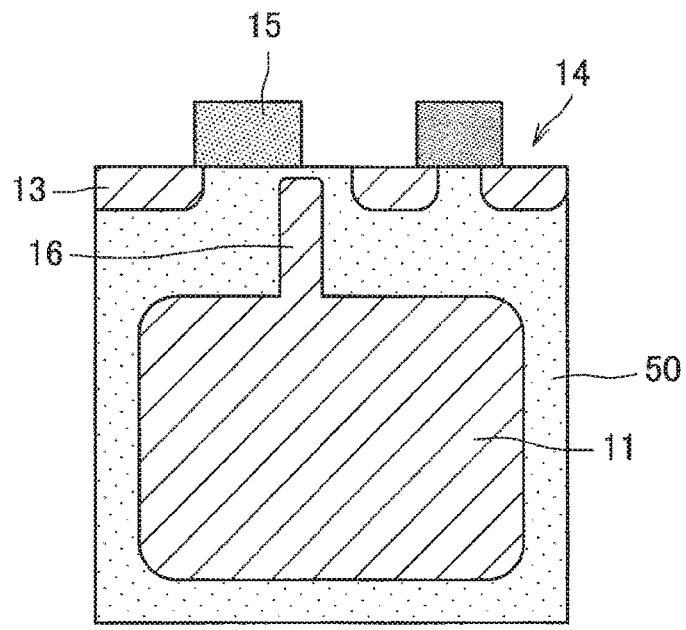

[FIG. 5A]
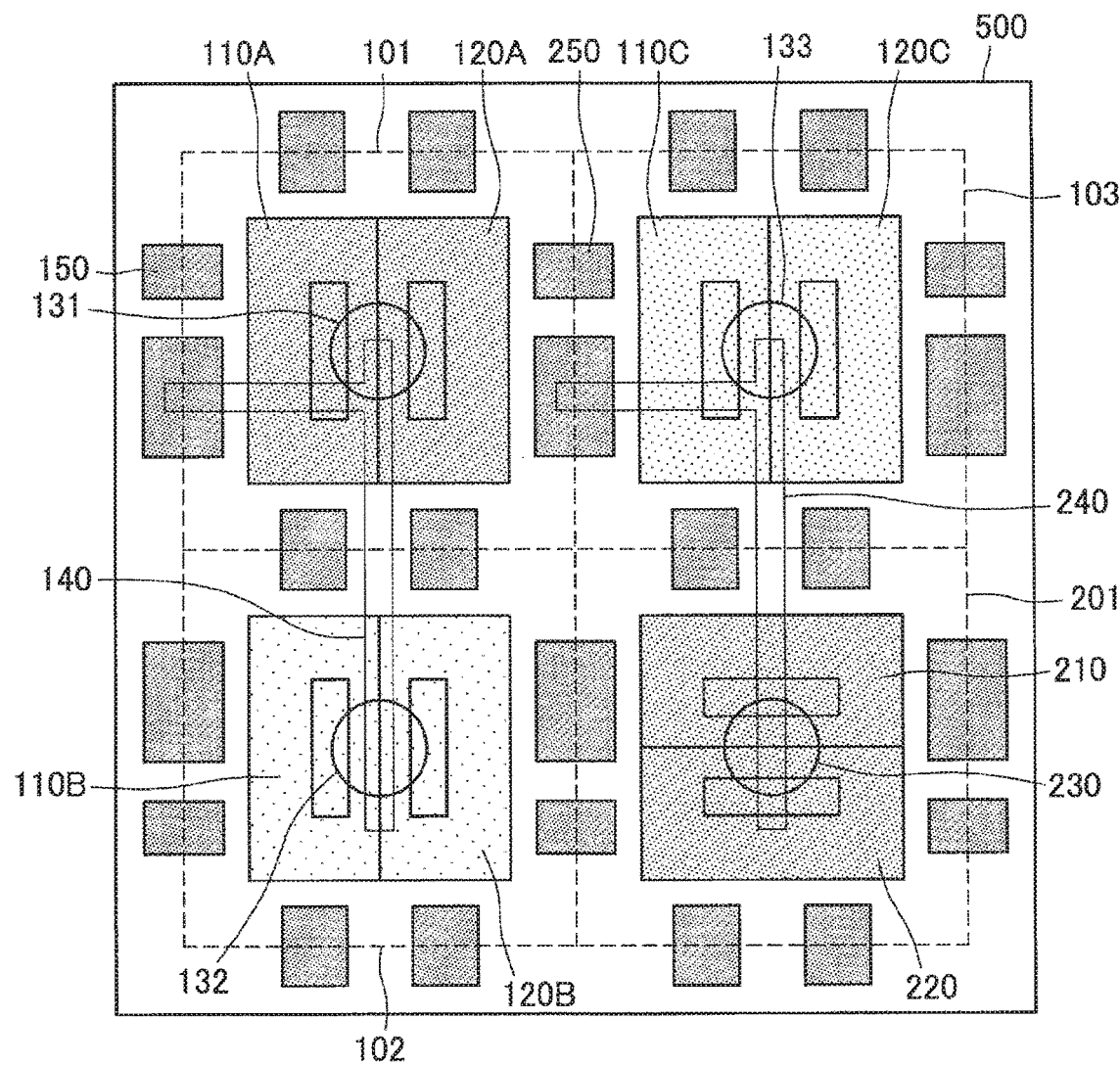
[FIG. 5B]
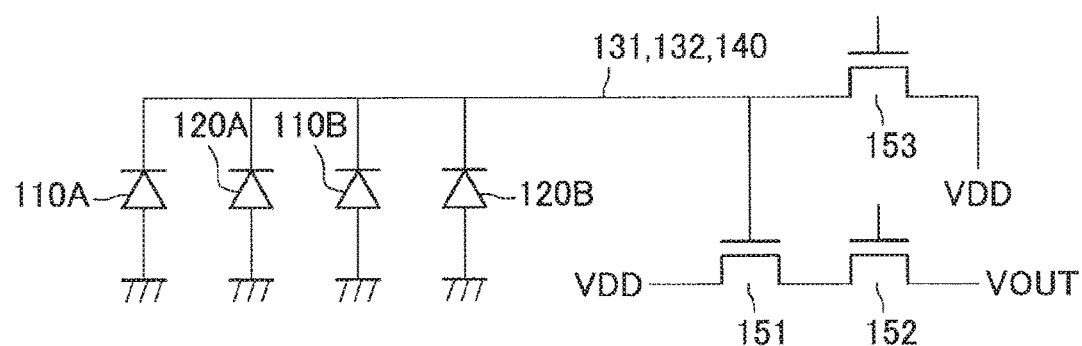

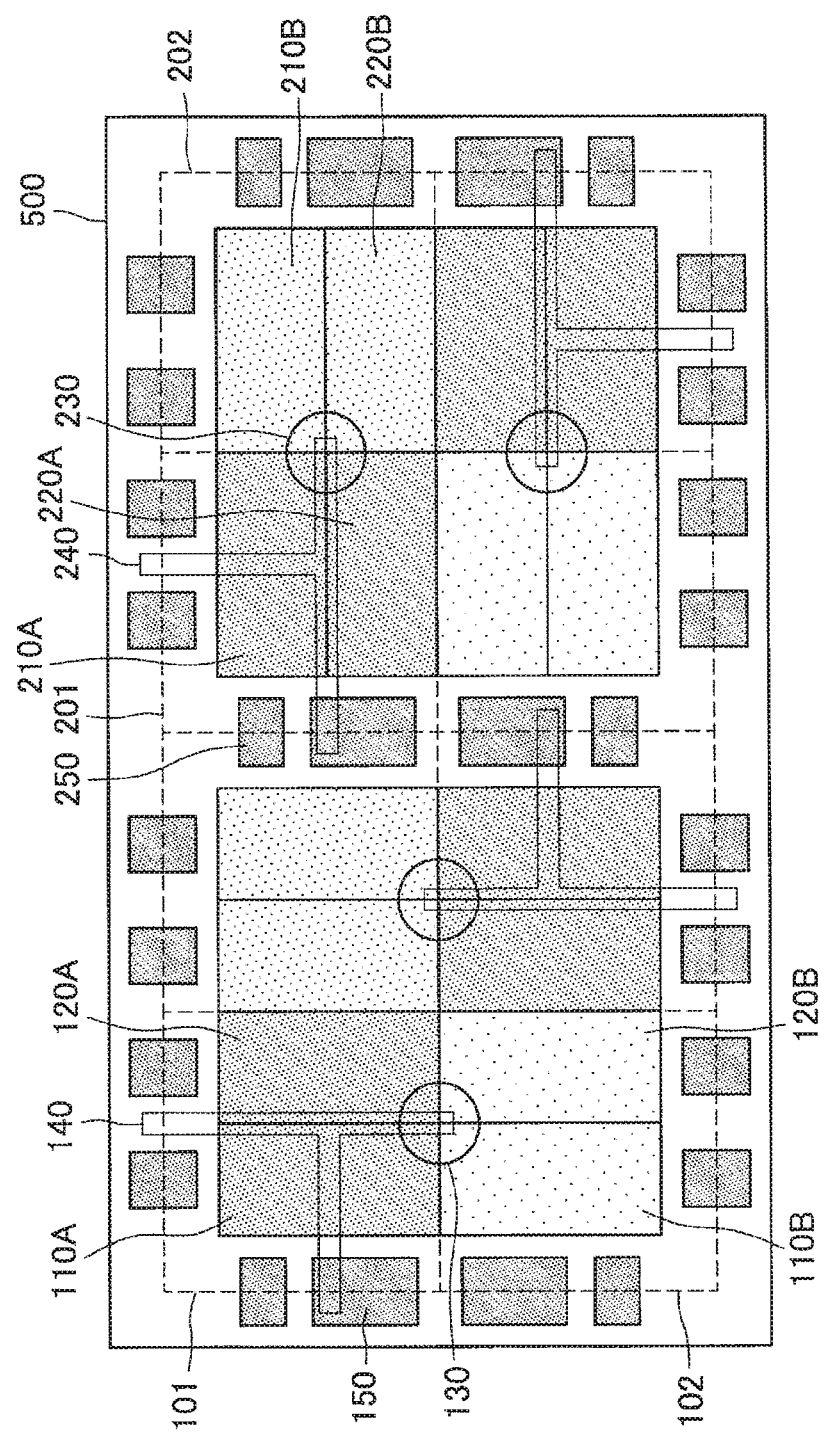
[FIG. 6]

[FIG. 7]
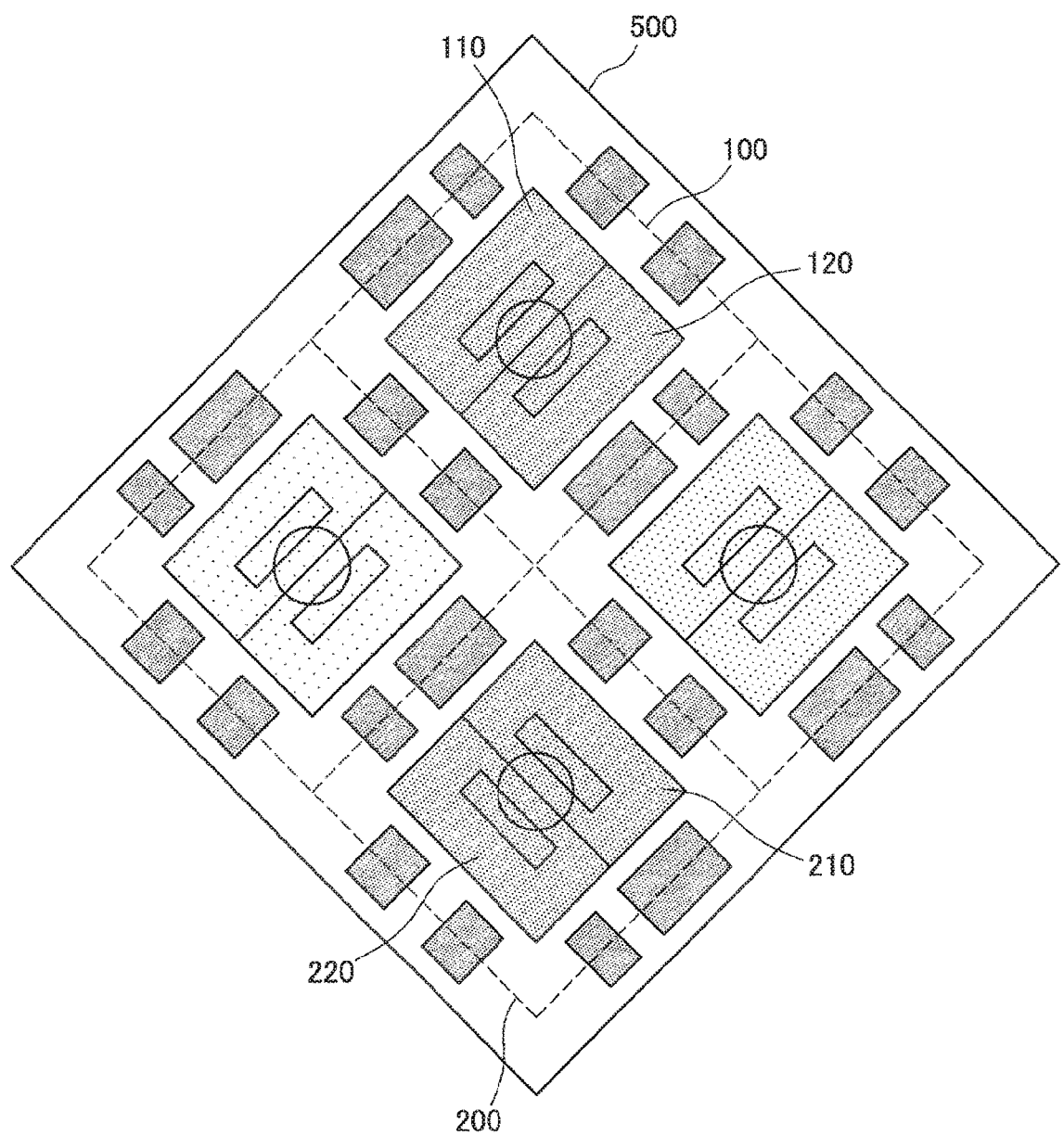

[FIG. 8]
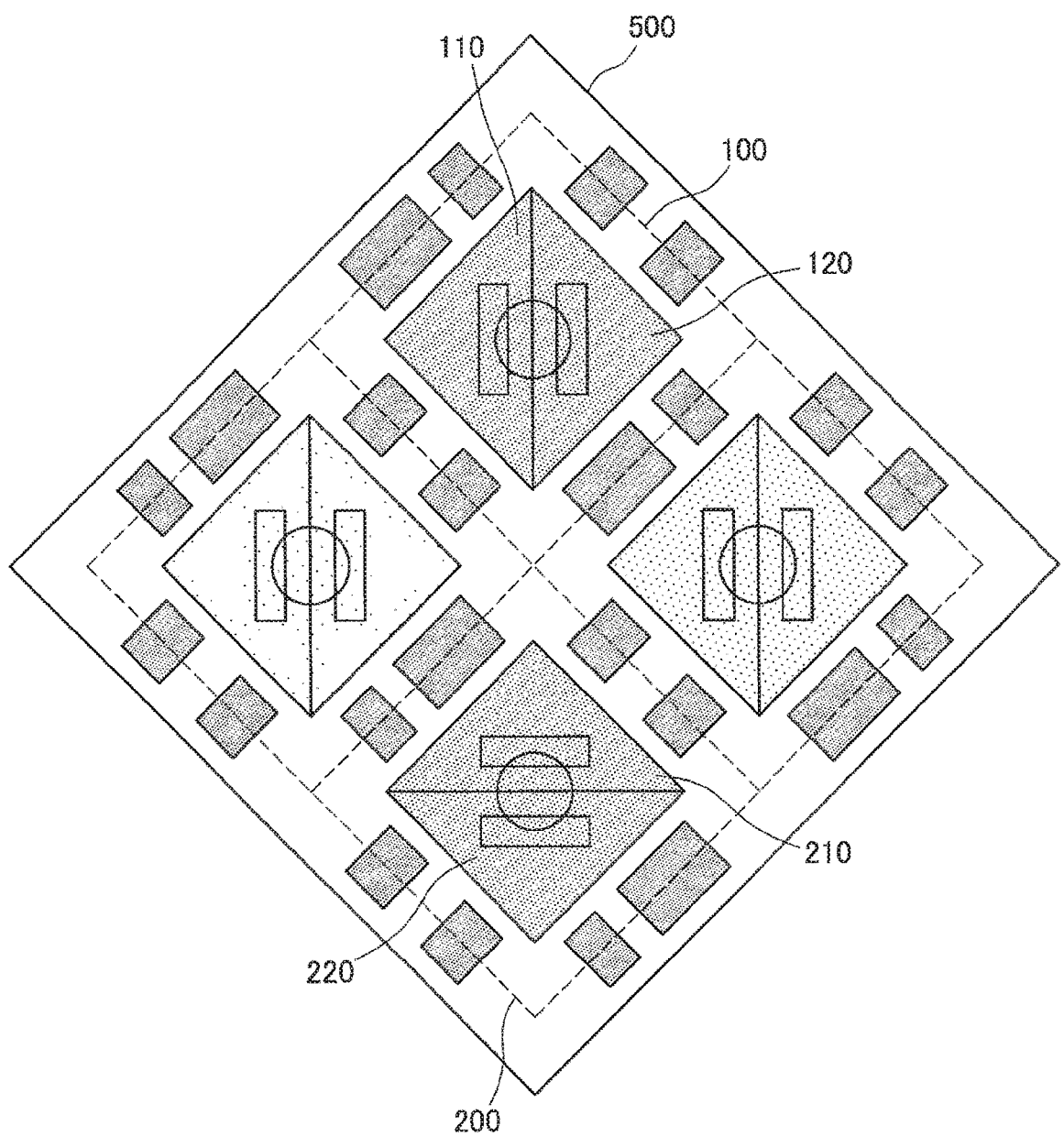

[FIG. 9A]
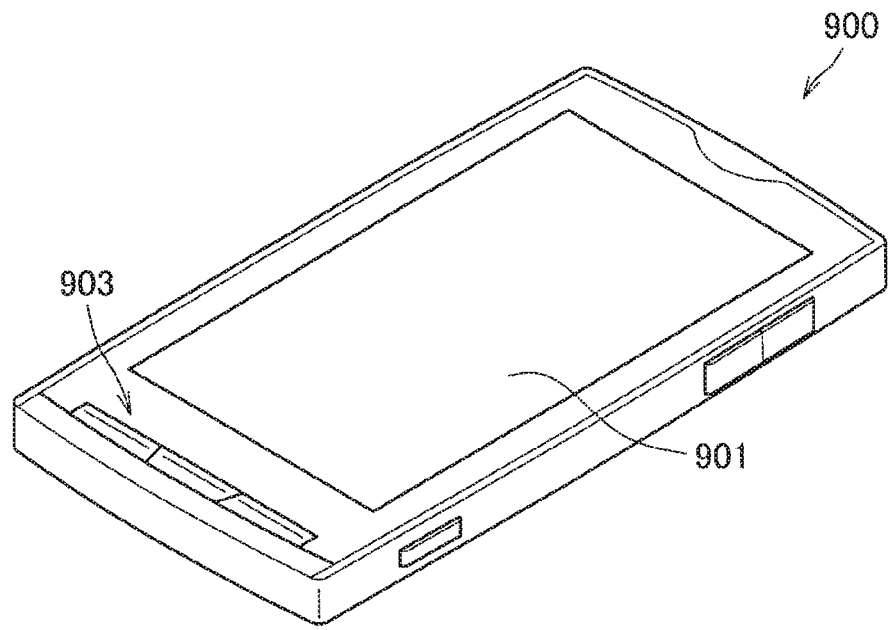
[FIG. 9B]
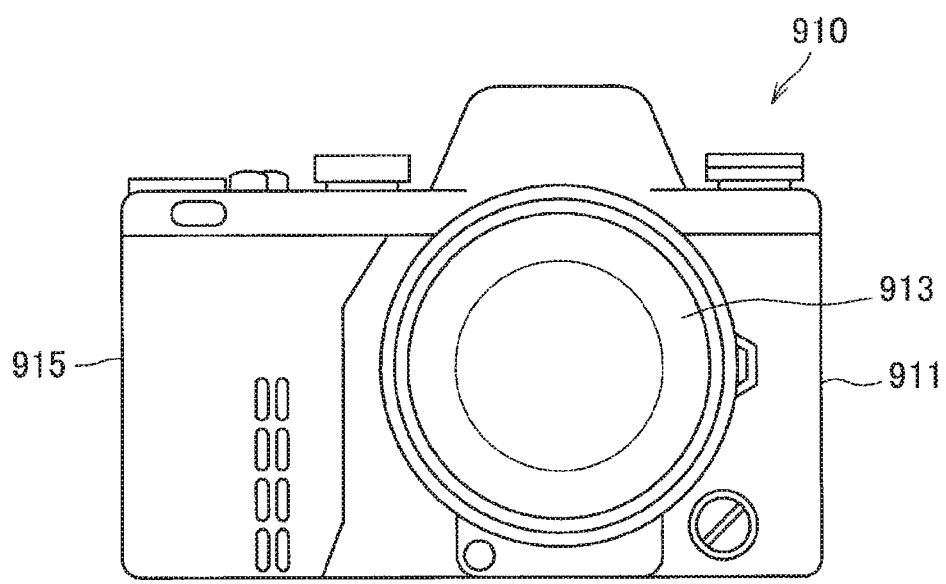

[FIG. 9C]
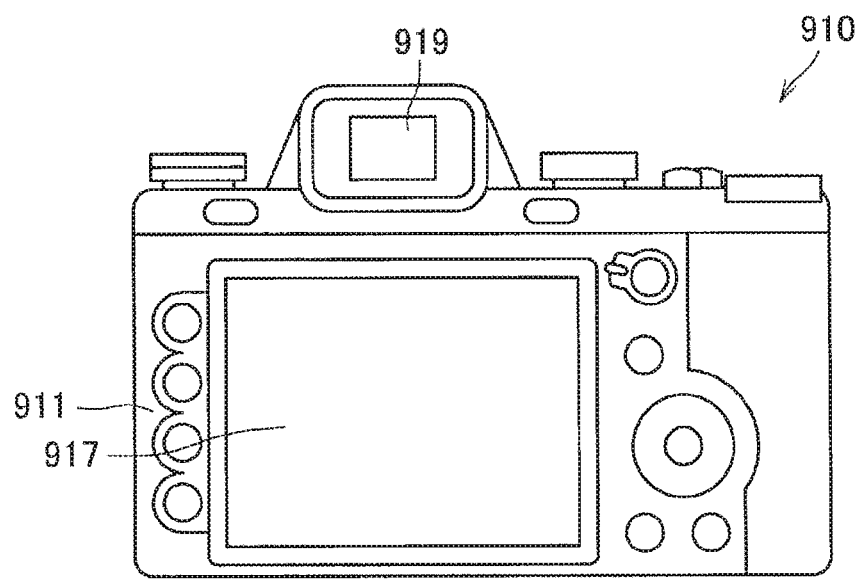

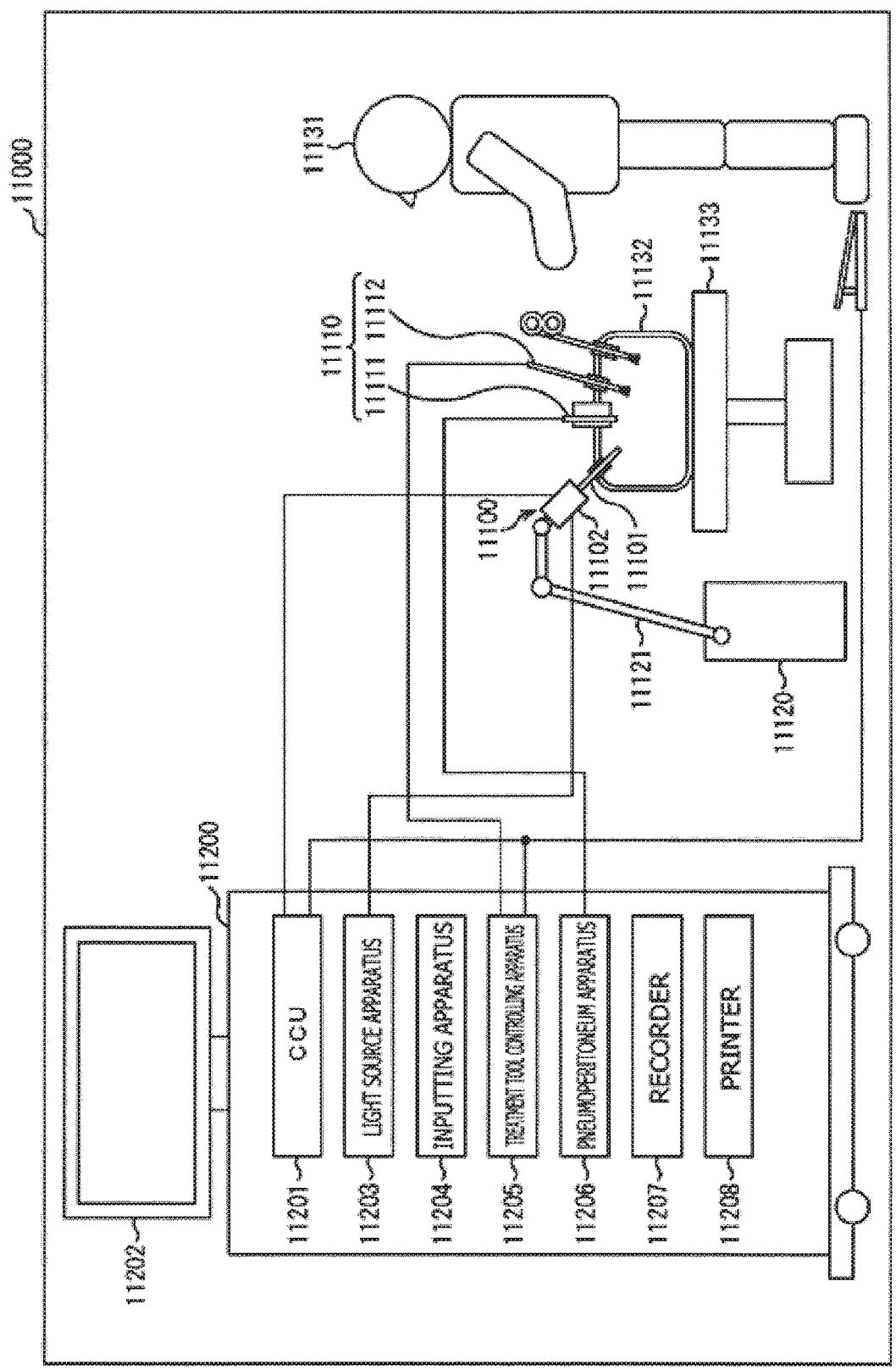
[FIG. 10]

[FIG. 11]
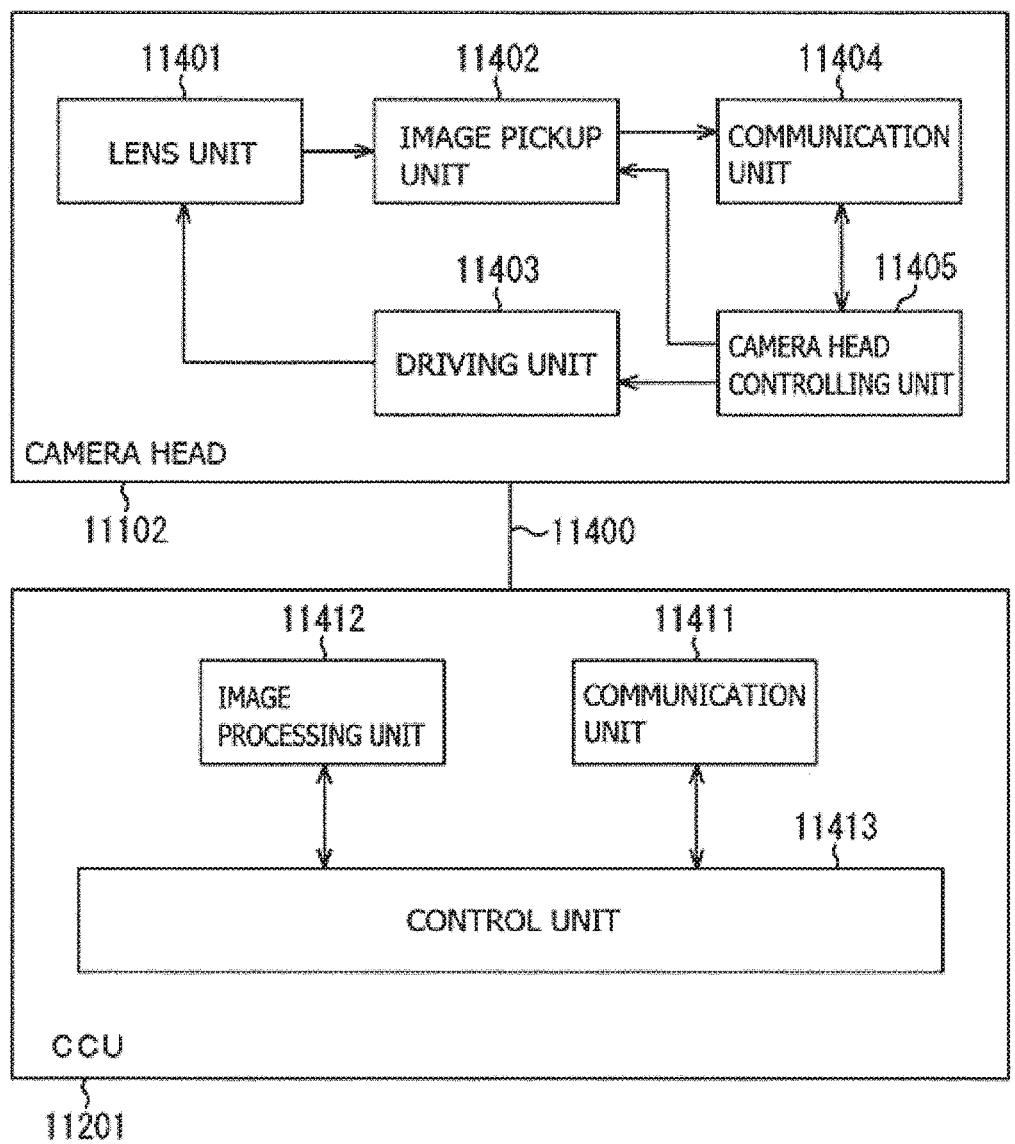

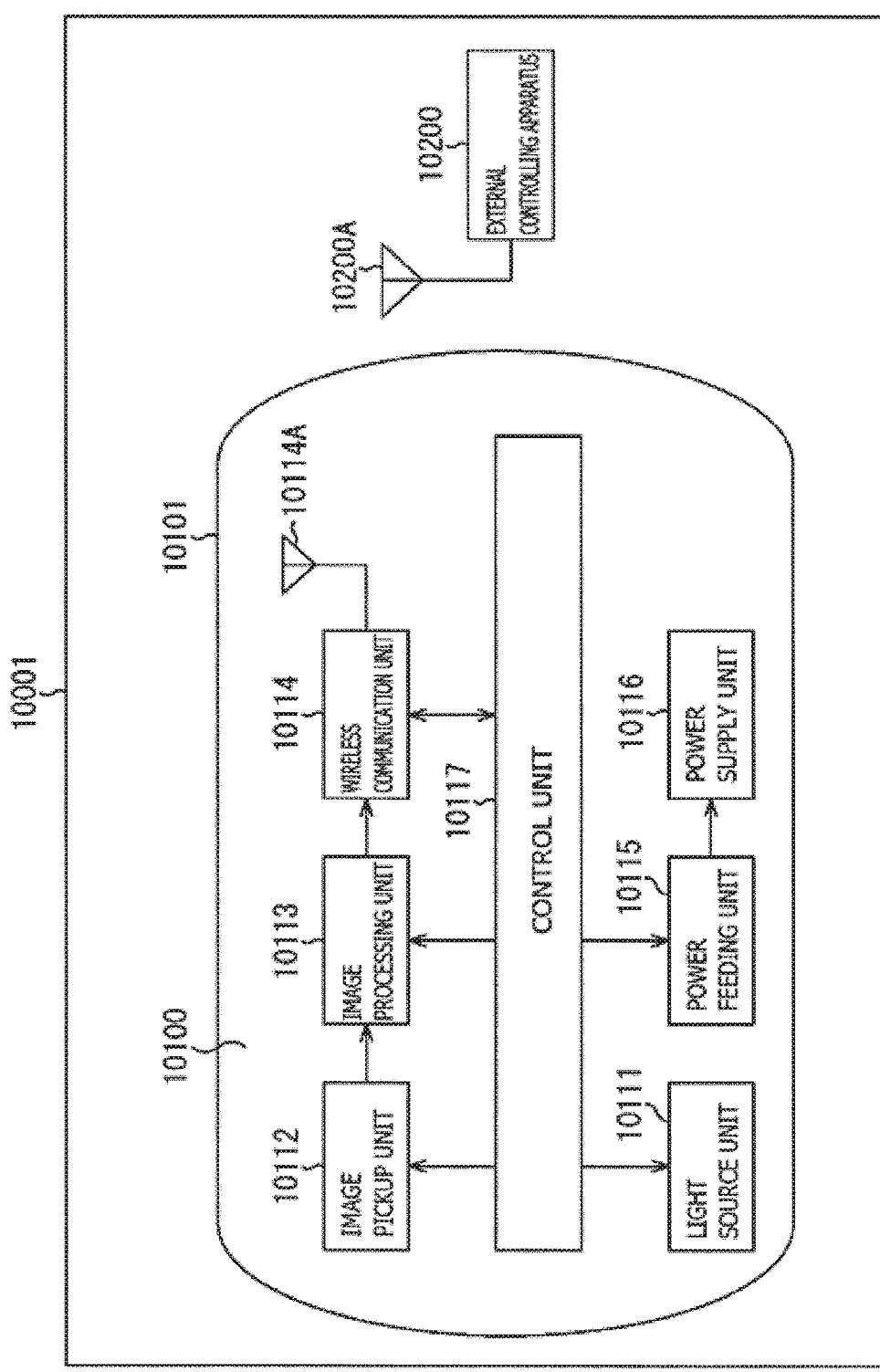
[FIG. 12]

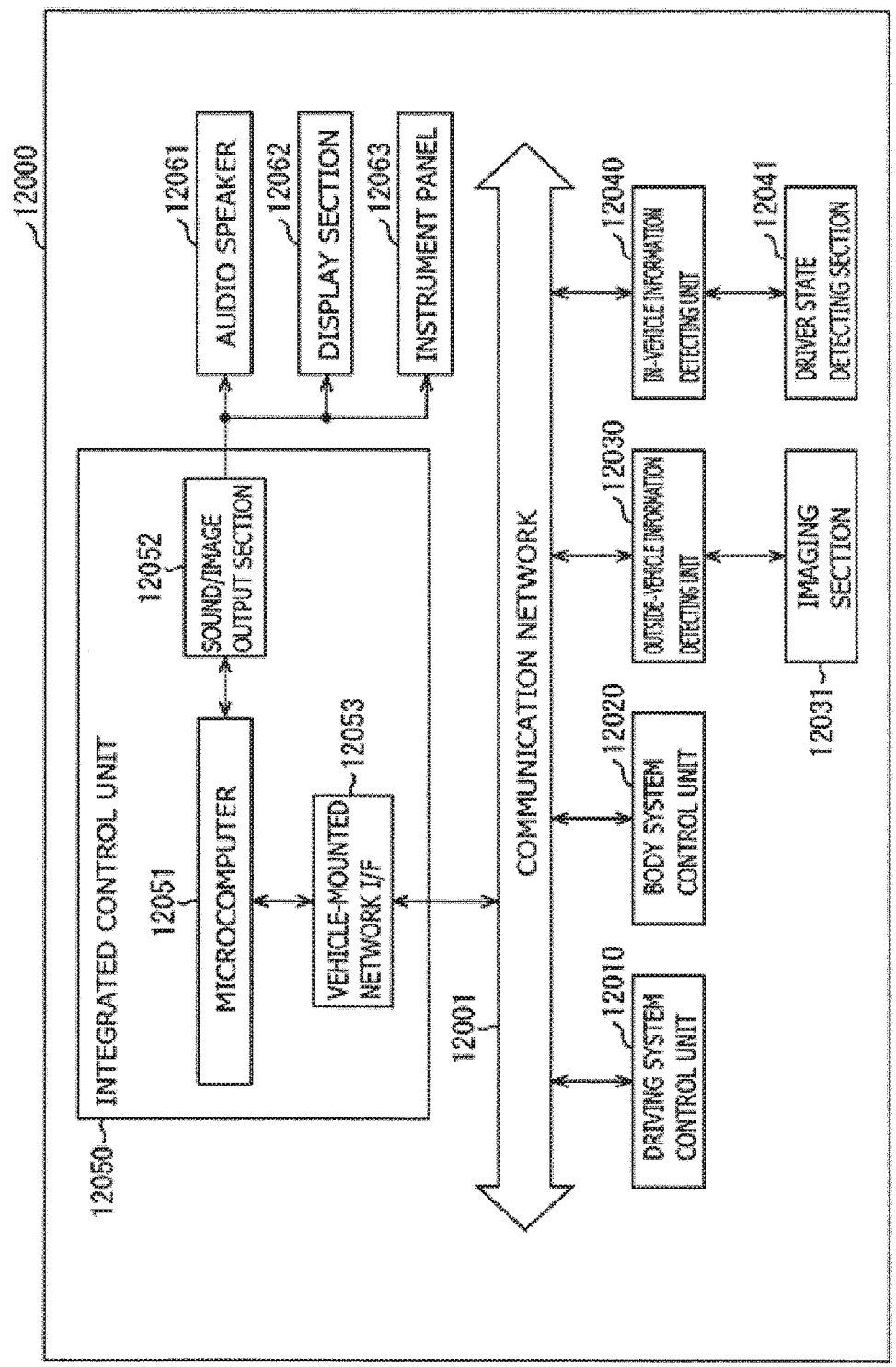
[FIG. 13]

[FIG. 14]
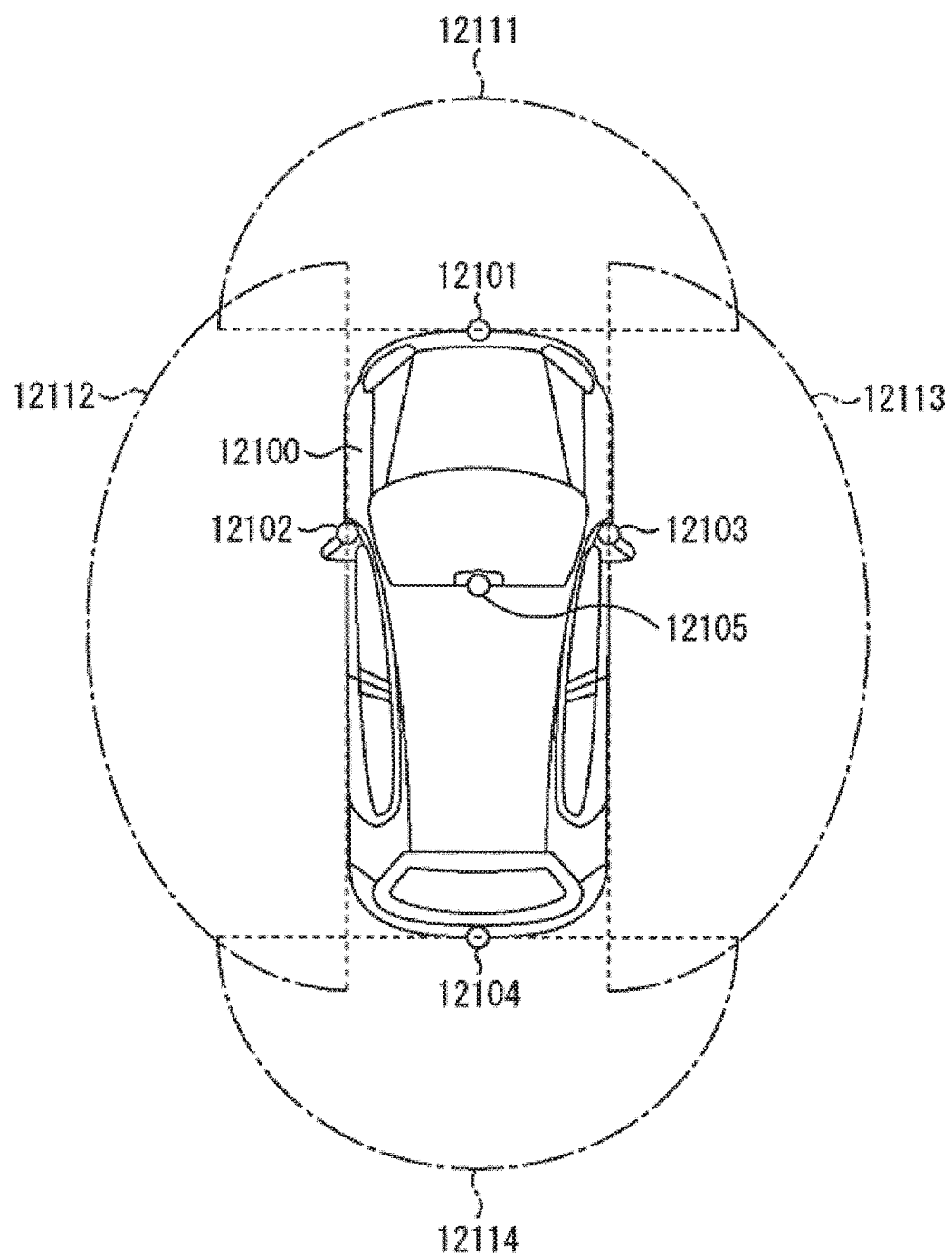

SOLID-STATE IMAGING DEVICE AND ELECTRONIC APPARATUS

CROSS REFERENCE TO RELATED APPLICATIONS

This application is a U.S. National Phase of International Patent Application No. PCT/JP2018/035176 filed on Sep. 21, 2018, which claims priority benefit of Japanese Patent Application No. JP 2017-204912 filed in the Japan Patent Office on Oct. 24, 2017. Each of the above-referenced applications is hereby incorporated herein by reference in its entirety.

TECHNICAL FIELD

The present disclosure relates to a solid-state imaging device and an electronic apparatus.

BACKGROUND ART

In recent years, it has become common to use pupil-division phase difference detection for focusing of a solid-state imaging device.

In the pupil-division phase difference detection, for example, a pixel in which a pair of sub-pixels is provided beneath one microlens is used. This makes it possible for the solid-state imaging device to calculate an amount of out-of-focus (an amount of defocus) on an object from an amount of misalignment (a shift amount) of respective images formed on the pair of sub-pixels.

Furthermore, it has been proposed that a pixel configured to perform such phase difference detection acquire pixel information for image generation as well as detect a phase difference. For example, it has been proposed that a pixel configured to perform phase difference detection acquire information for image generation by processing respective signals detected in a pair of sub-pixels as a signal of one pixel.

Specifically, PTL 1 mentioned below discloses that a pixel configured to perform pupil-division phase difference detection controls a potential barrier between respective photoelectric conversion elements included in two sub-pixels, thereby improving the performances of both focus detection and image generation.

CITATION LIST

Patent Literature

PTL 1: Japanese Unexamined Patent Application Publication No. 2015-162658

SUMMARY OF THE INVENTION

Problems to be Solved by the Invention

However, in the pupil-division phase difference detection as disclosed in PTL 1, in a case where an amount of misalignment between respective images formed on two sub-pixels is small, it is difficult to detect an accurate amount of defocus. For example, in the pupil-division phase difference detection, it is difficult to detect an accurate amount of defocus on an elongated object that extends in a direction vertical to a direction in which a pair of sub-pixels is arrayed.

Accordingly, the present disclosure proposes a novel and improved solid-state imaging device or electronic apparatus that makes it possible to perform focus detection and image generation on objects of various shapes.

Means for Solving the Problems

According to the present disclosure, there is provided a solid-state imaging device including a pixel array in which multiple pixels are arrayed. The multiple pixels each receive light in a predetermined wavelength band. The pixel array includes at least one or more first pixels and at least one or more second pixels. The at least one or more first pixels each include a pair of sub-pixels provided beneath one microlens. The pair of sub-pixels is aligned in a first direction. The at least one or more second pixels each include a pair of sub-pixels provided beneath one microlens. The pair of sub-pixels is aligned in a second direction. The second direction is perpendicular to the first direction.

In addition, according to the present disclosure, there is provided an electronic apparatus including a solid-state imaging device including a pixel array in which multiple pixels are arrayed. The multiple pixels each receive light in a predetermined wavelength band. The pixel array includes at least one or more first pixels and at least one or more second pixels. The at least one or more first pixels each include a pair of sub-pixels provided beneath one microlens. The pair of sub-pixels is aligned in a first direction. The at least one or more second pixels each include a pair of sub-pixels provided beneath one microlens. The pair of sub-pixels is aligned in a second direction. The second direction is perpendicular to the first direction.

According to the present disclosure, it enables pixels that acquire information for focus detection and information for image generation to be a mixture of multiple types of pixels that differ in the array direction of a pair of sub-pixels.

Effects of the Invention

As described above, according to the present disclosure, it is possible for the solid-state imaging device and the electronic apparatus to perform focus detection and image generation on objects of various shapes.

It is to be noted that the above-described effects are not necessarily limitative. Any of the effects indicated in this description or other effects that may be understood from this description may be exerted in addition to the above-described effects or in place of the above-described effects.

BRIEF DESCRIPTION OF DRAWING

FIG. 1 is a plan view illustrating an example of a planar layout of a pixel array included in a solid-state imaging device according to an embodiment of the present disclosure.

FIG. 2 is a longitudinal cross-sectional view illustrating a configuration of one sub-pixel in FIG. 1.

FIG. 3A is a plan view illustrating a planar configuration of one pixel of the solid-state imaging device according to the embodiment.

FIG. 3B is a longitudinal cross-sectional view schematically illustrating a cross section taken along a line A-AA in FIG. 3A.

FIG. 3C is a circuit diagram illustrating an equivalent circuit of the configuration illustrated in FIG. 3A.

FIG. 3D is a plan view illustrating a planar configuration of respective wiring lines in a first pixel and a second pixel.

FIG. 4 is a longitudinal cross-sectional view illustrating a modification example of a configuration of one sub-pixel.

FIG. 5A is a plan view illustrating a modification example of a planar configuration including multiple pixels.

FIG. 5B is a circuit diagram illustrating an equivalent circuit of the configuration illustrated in FIG. 5A.

FIG. 6 is a plan view illustrating a modification example of the planar configuration including the multiple pixels.

FIG. 7 is a plan view illustrating a modification example of a planar configuration of the pixel array.

FIG. 8 is a plan view illustrating a modification example of the planar configuration of the pixel array.

FIG. 9A is an appearance view illustrating an example of an electronic apparatus to which the solid-state imaging device according to the embodiment is applicable.

FIG. 9B is an appearance view illustrating another example of the electronic apparatus to which the solid-state imaging device according to the embodiment is applicable.

FIG. 9C is an appearance view illustrating another example of the electronic apparatus to which the solid-state imaging device according to the embodiment is applicable.

FIG. 10 is a view depicting an example of a schematic configuration of an endoscopic surgery system.

FIG. 11 is a block diagram depicting an example of a functional configuration of a camera head and a camera control unit (CCU).

FIG. 12 is a block diagram depicting an example of a schematic configuration of an in-vivo information acquisition system.

FIG. 13 is a block diagram depicting an example of schematic configuration of a vehicle control system.

FIG. 14 is a diagram of assistance in explaining an example of installation positions of an outside-vehicle information detecting section and an imaging section.

MODES FOR CARRYING OUT THE INVENTION

The following describes a preferred embodiment of the present disclosure in detail with reference to the accompanying drawings. It is to be noted that, in this description and the accompanying drawings, components that have substantially the same functional configuration are indicated by the same reference signs, and thus redundant description thereof is omitted.

It is to be noted that the description is given in the following order.
1. Solid-State Imaging Device
1.1. Schematic Configuration of Pixel Array
1.2. Specific Configuration of Pixel Array
2. Modification Examples
3. Application Examples
3.1. Electronic Apparatus
3.2. Endoscopic Surgery System
3.3. In-Vivo Information Acquisition System
3.4. Mobile Body

1. SOLID-STATE IMAGING DEVICE (1.1. Schematic Configuration of Pixel Array)

First, a schematic configuration of a solid-state imaging device according to an embodiment of the present disclosure is described with reference to FIGS. 1 and 2. FIG. 1 is a plan view illustrating an example of a planar layout of a pixel array included in the solid-state imaging device according to the embodiment of the present disclosure.

First, the planar layout of a pixel array 500 included in the solid-state imaging device according to the present embodiment is described with reference to FIG. 1. As illustrated in FIG. 1, the pixel array 500 included in the solid-state imaging device according to the present embodiment includes multiple arrayed pixels that each receive light in a predetermined wavelength band.

Specifically, the pixel array 500 may include pixels (red pixels, green pixels, and blue pixels), which receive respective pieces of light in wavelength bands corresponding to red, green, and blue colors, disposed in predetermined array. For example, the pixel array 500 may include repeatedly arrayed pixel units each including four pixels: a red pixel, a blue pixel, and two green pixels. Alternatively, the pixel array 500 may include repeatedly arrayed pixel units each including four pixels: a red pixel, a green pixel, a blue pixel, and a white pixel (i.e., a pixel provided with no color filter). However, the array of multiple pixels in the pixel array 500 is not particularly limited, and it is possible to apply a variety of arrays, for example, a delta array, a stripe array, a diagonal array, a rectangle array, etc.

Furthermore, in the solid-state imaging device according to the present embodiment, each of the pixels acquires ranging information for focus detection besides pixel information for image generation. Specifically, to acquire ranging information for focus detection, each of the pixels includes a pair of sub-pixels provided beneath one microlens. In such a pixel, one of the sub-pixels receives a light flux that has entered from one side of the microlens, and the other sub-pixel receives a light flux that has entered from the other side of the microlens. At this time, between an image of light received by the one of the sub-pixels and an image of light received by the other sub-pixel, there is an amount of misalignment (a shift amount) correlated with a defocus amount of focus on an object. Accordingly, comparing respective images of light received by a pair of sub-pixels allows each pixel to detect a defocus amount of focus on an object.

Here, in the solid-state imaging device according to the present embodiment, the pixel array 500 includes at least one or more first pixels 100 each provided with a pair of sub-pixels 110 and 120 aligned in a first direction and at least one or more second pixels 200 each provided with a pair of sub-pixels 210 and 220 aligned in a second direction perpendicular to the first direction.

The first pixel 100 includes the pair of sub-pixels 110 and 120 and a pixel transistor group 150. Furthermore, as with the first pixel 100, the second pixel 200 includes the pair of sub-pixels 210 and 220 and a pixel transistor group 250. The first pixel 100 and the second pixel 200 have a substantially similar configuration except for the direction in which the pair of sub-pixels is aligned; therefore, in the following, the first pixel 100 is described as an example.

The pair of sub-pixels 110 and 120 is provided beneath one microlens and a color filter and aligned in the first direction or the second direction. The pair of sub-pixels 110 and 120 photoelectrically converts incident light, thereby acquiring ranging information for focus detection and pixel information for image generation.

Specifically, as described above, the sub-pixels 110 and 120 calculate shift amounts of respective images of light received by the sub-pixels 110 and 120, thereby making it possible to acquire information for focus detection. Furthermore, the sub-pixels 110 and 120 perform signal processing on respective signals photoelectrically converted by the sub-pixels 110 and 120, thereby making it possible to acquire pixel information for obtaining a color image of an object.

The sub-pixels 110 and 120 may be provided in the same planar shape. The sub-pixels 110 and 120 are provided to have the same configuration except for the positions with respect to the microlens, and thus are able to accurately detect an amount of misalignment of images due to pupil division. Specifically, the sub-pixels 110 and 120 may be provided in the same planar shape to have the same degree of aperture. For example, the planar shapes of the sub-pixels 110 and 120 may be rectangles each obtained by dividing a square into two.

The pixel transistor group 150, for example, transfers and amplifies signals outputted from the sub-pixels 110 and 120, thereby generating information outputted from the first pixel 100. Specifically, the pixel transistor group 150 may generate ranging information for focus detection and pixel information for image generation on the basis of signals outputted from the sub-pixels 110 and 120. For example, the pixel transistor group 150 may acquire pixel information for image generation by adding up respective signals outputted from the sub-pixels 110 and 120.

In such a configuration, each of the pixels in the pixel array 500 according to the present embodiment is able to acquire ranging information for focus detection and pixel information for image generation from the same pixel.

In a case where each of the pixels in the pixel array 500 acquires only either information for focus detection or information for image generation, fewer pixels acquire pixel information with an increase in pixels that perform focus detection; therefore, the quality of an image is reduced. Meanwhile, with a decrease in pixels that perform focus detection, the accuracy of focusing decreases; therefore, an image is likely to be blurred. That is, in a case where each of the pixels in the pixel array 500 acquires only either information for focus detection or information for image generation, the accuracy of focusing and the quality of an image fall into a trade-off relationship. Meanwhile, the solid-state imaging device according to the present embodiment makes it possible to improve the accuracy of focusing without causing the quality of an image to be reduced.

Here, the directions in which the respective pairs of sub-pixels in the first pixel 100 and the second pixel 200 are arrayed are perpendicular to each other.

As described above, in pupil-division phase difference detection, an amount of out-of-focus on an object is calculated from an amount of misalignment between an image of light received by one of the sub-pixels and an image of light received by the other sub-pixel. Therefore, in a case of an object having a shape unlikely to cause an amount of misalignment between a pair of sub-pixels, detection of an accurate amount of defocus may be difficult. For example, in a case where an object has an elongated shape that extends in a direction perpendicular to a direction in which a pair of sub-pixels is arrayed, it may be difficult to detect an accurate amount of defocus with only pixels in which a pair of sub-pixels is arrayed in one direction.

The pixel array 500 according to the present embodiment includes a mixture of the first pixels 100 and the second pixels 200. The array direction of the pair of sub-pixels in each first pixel 100 is perpendicular to the array direction of the pair of sub-pixels in each second pixel 200. Thus, even if an object has an elongated shape that extends in either of the directions, it is possible to detect an accurate amount of defocus. Specifically, even if an object has an elongated shape that extends in either of the directions, either the first pixels 100 or the second pixels 200 in the pixel array 500 are able to detect an accurate amount of defocus. Therefore, the solid-state imaging device according to the present embodiment makes it possible to perform focus detection and image generation on objects of various shapes, and thus makes it possible to acquire a clearer image.

For example, the planar shapes of the first pixel 100 and the second pixel 200 may be fourfold symmetric planar shapes. Specifically, the planar shapes of the first pixel 100 and the second pixel 200 may be shapes that are the same when each rotated by 90° about its center of gravity. In a case where the planar shapes of the first pixel 100 and the second pixel 200 are fourfold symmetric planar shapes, it is possible to form the second pixel 200 by rotating the first pixel 100 by 90°; therefore, it is possible to mix and form the first pixels 100 and the second pixels 200 more easily. As such a fourfold symmetric shape, it is possible to exemplify, for example, a square shape, a regular octagon shape, or a circular shape.

More specifically, the first pixel 100 and the second pixel 200 may have the same planar shape. In such a case, it is easy to lay the first pixels 100 and the second pixels 200 out in the pixel array 500. Furthermore, in such a case, each of the first pixels 100 and each of the second pixels 200 have the same degree of pixel aperture; thus, pixel information acquired from each pixel is usable for image generation without correction.

However, all the pixels included in the pixel array 500 do not have to acquire ranging information for focusing or pixel information for image generation. For example, the pixel array 500 may include a pixel including at least one or more pairs of sub-pixels that each acquire the above-described ranging information for focusing and pixel information for image generation. That is, the pixel array 500 only has to include at least one or more first pixels 100 and at least one or more second pixels 200 described above. In such a case, green pixels may be the first pixels 100 and the second pixels 200 that each include a pair of sub-pixels. Green light that is subjected to photoelectrical conversion by a green pixel is more easily absorbed by a silicon photodiode than red light and blue light that are subjected to photoelectrical conversion by a red pixel and a blue pixel. Accordingly, green light is easily photoelectrically converted, and a signal is easily obtained. Therefore, in a case where the first pixels 100 and the second pixels 200 include green pixels, it is possible to acquire ranging information for focus detection with higher accuracy.

Next, an example of a configuration of the above-described sub-pixels is described with reference to FIG. 2. FIG. 2 is a longitudinal cross-sectional view illustrating a configuration of one sub-pixel in FIG. 1.

As illustrated in FIG. 2, sub-pixels included in the first pixel 100, the second pixel 200, etc. each include a photoelectric conversion element 11, a transfer transistor 12, and a floating diffusion layer 13 that are embedded in a semiconductor substrate 50. The pixel control transistor 14 is, for example, one of the transistors included in the transistor group illustrated as the pixel transistor group 150 in FIG. 1.

The semiconductor substrate 50 is a substrate that includes a semiconductor material. For example, the semiconductor substrate 50 may be a silicon substrate. It is to be noted that the semiconductor substrate 50 may be a substrate that includes another elemental semiconductor such as germanium, or a substrate that includes a compound semiconductor such as gallium arsenide (GaAs), gallium nitride (GaN), or silicon carbide (SiC).

The photoelectric conversion element 11 is, for example, a photodiode, and is provided to be embedded inside the semiconductor substrate 50. Specifically, the photoelectric conversion element 11 converts light that has entered the sub-pixel into electrons and holes by a photovoltaic effect caused by a p-n junction or a pin junction. For example, the photoelectric conversion element 11 may include an n-type semiconductor region provided inside a p-type semiconductor region. The entry of light causes electrons to be generated in the n-type semiconductor region, and causes holes to be generated in the p-type semiconductor region in the photoelectric conversion element 11. Thus, the sub-pixel takes the electrons generated in the n-type semiconductor region into the transfer transistor 12, thereby making it possible to convert the light that has entered the sub-pixel into a signal.

The transfer transistor 12 retrieves an electric charge from the photoelectric conversion element 11 provided inside the semiconductor substrate 50, and transfers the retrieved electric charge to the floating diffusion layer 13 on the surface of the semiconductor substrate 50. Specifically, the transfer transistor 12 is provided as a vertical transistor having a vertical gate structure that extends toward the inside of the semiconductor substrate 50, and causes the photoelectric conversion element 11 and the floating diffusion layer 13 to function as a source or drain region. Therefore, in a case where a voltage equal to or higher than a threshold voltage is applied to a vertical gate, the transfer transistor 12 forms a channel along the vertical gate, thereby making it possible to transfer the electric charge generated in the photoelectric conversion element 11 to the floating diffusion layer 13.

The floating diffusion layer 13 is formed as an n-type semiconductor region, and accumulates an electric charge. It is to be noted that the floating diffusion layer 13 function as a floating diffusion. The floating diffusion layer 13 controls, for example, a gate voltage of an amplification transistor in accordance with an electric potential generated by the accumulated electric charge, and reads and outputs a signal generated by the sub-pixel receiving light to the outside.

The pixel control transistor 14 is a field effect transistor provided on the surface of the semiconductor substrate 50. Specifically, the pixel control transistor 14 includes a gate electrode provided on the semiconductor substrate 50 and a source or drain region provided in the semiconductor substrate 50 across the gate electrode. The pixel control transistor 14 may be provided in a region that overlaps with the photoelectric conversion element 11 when the principal surface of the semiconductor substrate 50 is viewed planarly. In the sub-pixel illustrated in FIG. 2, the photoelectric conversion element 11 is embedded inside the semiconductor substrate 50, and is located at a distance from the surface of the semiconductor substrate 50. Such a configuration makes it possible to form the pixel control transistor 14 to be superimposed on the photoelectric conversion element 11. The pixel control transistor 14 is likely to be affected by noise, etc. in a case where the pixel control transistor 14 comes close to the photoelectric conversion element 11.

In the sub-pixel having such a configuration, it is possible to superimpose and form the photoelectric conversion element 11 and the pixel control transistor 14 in the same planar region, and thus it is possible to make the volume of the photoelectric conversion element 11 larger. This makes it possible to reduce the area of the entire sub-pixel without reducing the sensitivity, the amount of saturation electrons, etc. of the photoelectric conversion element 11.

(1.2. Specific Configuration of Pixel Array)

A specific configuration of the solid-state imaging device according to the present embodiment is described with reference to FIGS. 3A, 3B, 3C, and 3D.

First, a specific configuration of one pixel is described with reference to FIGS. 3A, 3B, and 3C. FIG. 3A is a plan view illustrating a planar configuration of one pixel of the solid-state imaging device according to the present embodiment, and FIG. 3B is a longitudinal cross-sectional view schematically illustrating a cross section taken along a line A-AA in FIG. 3A. FIG. 3C is a circuit diagram illustrating an equivalent circuit of the configuration illustrated in FIG. 3A. It is to be noted here that the first pixel 100 is described as an example, but the same applies to the second pixel 200 except for the array direction of a pair of sub-pixels.

As illustrated in FIGS. 3A and 3B, the first pixel 100 includes the pair of sub-pixels 110 and 120, vertical gate electrodes 111 and 121, a floating diffusion layer 130, a pixel wiring line 140, an amplification transistor 151, a selection transistor 152, a reset transistor 153, and a dummy gate 154. Furthermore, photoelectric conversion elements 112 and 122 are provided inside regions of the semiconductor substrate 50 corresponding to the sub-pixels 110 and 120, respectively.

The pair of sub-pixels 110 and 120 includes the pair of photoelectric conversion elements 112 and 122 formed inside the semiconductor substrate 50, and converts received light into an electric charge. Specifically, the pair of sub-pixels 110 and 120 corresponds to the pair of photoelectric conversion elements 112 and 122, and the photoelectric conversion elements 112 and 122 include a pair of n-type semiconductor regions provided inside a p-type semiconductor region. In the photoelectric conversion elements 112 and 122, incident light is converted into an electric charge by a photovoltaic effect. Specifically, electrons are generated in the n-type semiconductor regions, and holes are generated in the p-type semiconductor region. That is, the photoelectric conversion elements 112 and 122 are able to convert an amount of the incident light into an amount of the electrons generated in the n-type semiconductor regions. It is to be noted that a region between the n-type semiconductor regions is the p-type semiconductor region, and thus the photoelectric conversion elements 112 and 122 are electrically isolated by a potential barrier.

The photoelectric conversion elements 112 and 122 are provided inside the semiconductor substrate 50, and thus it is possible to make their volume larger. Therefore, it is possible to increase the sensitivity, the amount of saturation electrons, etc. without increasing the planar occupation area. The semiconductor substrate 50 may be a substrate that includes a semiconductor material such as silicon, a substrate that includes another elemental semiconductor such as germanium, or a substrate that includes a compound semiconductor such as gallium arsenide (GaAs), gallium nitride (GaN), or silicon carbide (SiC).

The vertical gate electrodes 111 and 121 are the gate of a field effect transistor that transfers respective electric charges generated by the photoelectric conversion elements 112 and 122 to the floating diffusion layer 130. To retrieve the electric charges from the photoelectric conversion elements 112 and 122 provided inside the semiconductor substrate 50, the vertical gate electrodes 111 and 121 are provided in the shape of a vertically long column that extends to the inside of the semiconductor substrate 50. The vertical gate electrodes 111 and 121 form a channel between the photoelectric conversion elements 112 and 122 and the floating diffusion layer 130 along the vertical gate electrodes 111 and 121 with the photoelectric conversion elements 112 and 122 and the floating diffusion layer 130 as a source or drain region. Thus, in a case where a voltage equal to or higher than a threshold voltage is applied, the vertical gate electrodes 111 and 121 are able to transfer the electric charges from the photoelectric conversion elements 112 and 122 to the floating diffusion layer 130 through the formed channel.

The floating diffusion layer 130 is formed as an n-type semiconductor region, and accumulates an electric charge. It is to be noted that the floating diffusion layer 130 function as a floating diffusion. Electric charges that have been transferred from the photoelectric conversion elements 112 and 122 and accumulated in the floating diffusion layer 130 generate an electric potential, thereby controlling a gate voltage of the amplification transistor 151 through the pixel wiring line 140. The floating diffusion layer 130 may be provided, for example, on a boundary between the pair of sub-pixels 110 and 120 (i.e., the photoelectric conversion elements 112 and 122). More specifically, the floating diffusion layer 130 may be provided in the middle of the first pixel 100 including the pair of sub-pixels 110 and 120. In such a case, it is possible to cause the center of the floating diffusion layer 130 and the center of the microlens provided on the first pixel 100 to be substantially with the same as each other.

The pixel wiring line 140 is a wiring line and a contact that electrically couple the floating diffusion layer 130 and a gate electrode of the amplification transistor 151, and electrically couple the floating diffusion layer 130 and a source or drain region of the reset transistor 153. The pixel wiring line 140 may include metal such as copper (Cu), aluminum (Al), titanium (Ti), or tungsten (W). The pixel wiring line 140 may include one type of metal, or may include several types of metals. For example, the wiring line and the contact of the pixel wiring line 140 may include different metals from each other.

The gate electrode of the amplification transistor 151 is electrically coupled to the floating diffusion layer 130 by the pixel wiring line 140, and the amplification transistor 151 is controlled by an electric potential to turn on/off. The electric potential is generated by an electric charge accumulated in the floating diffusion layer 130. Specifically, in a case where an electric potential generated by an electric charge accumulated in the floating diffusion layer 130 exceeds a threshold, the amplification transistor 151 goes into on-state, thereby causing an electric current to flow between the source and the drain. This allows the amplification transistor 151 to convert the electric charge accumulated in the floating diffusion layer 130 into the electric current between the source and the drain and amplify the electric current.

The selection transistor 152 is coupled in series to the amplification transistor 151, and controls the selection or non-selection of a pixel. Specifically, the selection transistor 152 controls whether or not to read out a signal from the first pixel 100 with a voltage applied to a gate electrode. This allows the solid-state imaging device to sequentially read out signals from the respective pixels.

A source or drain region of the reset transistor 153 is electrically coupled to the floating diffusion layer 130 by the pixel wiring line 140, and controls the electric potential of the floating diffusion layer 130. Specifically, the source or the drain of the reset transistor 153 is coupled to, for example, a power source (VDD). The reset transistor 153 goes into on-state, thereby forming a channel between the source and the drain, and the he reset transistor 153 controls the electric potential of the floating diffusion layer 130 equivalently to an electric potential of the power source (VDD).

The dummy gate 154 is an electrode that is not electrically coupled to a wiring line used to exchange a signal, etc., but is electrically coupled to the ground. That is, the dummy gate 154 is an electrode not used for signal processing of a signal outputted from the first pixel 100. The dummy gate 154 is provided to dispose gate electrodes provided around the pair of sub-pixels 110 and 120 of the first pixel 100 symmetrically with respect to the sub-pixels 110 and 120. For example, the dummy gate 154 is provided to allow light reflected by the respective gate electrodes of the amplification transistor 151, the selection transistor 152, and the reset transistor 153 to symmetrically leak into the photoelectric conversion elements 112 and 122. Disposing the dummy gate 154 makes it possible to suppress reduction in the accuracy of a phase difference detected by the sub-pixels 110 and 120.

It is to be noted that the amplification transistor 151, the selection transistor 152, the reset transistor 153, and the dummy gate 154 are formed over two sides of the first pixel 100 including the pair of sub-pixels 110 and 120. Over the other two sides of the first pixel 100, any of the amplification transistor 151, the selection transistor 152, the reset transistor 153, and the dummy gate 154 of an adjacent pixel may be formed.

FIG. 3C illustrates an equivalent circuit of a circuit of the first pixel 100 described above. As illustrated in FIG. 3C, the photoelectric conversion elements 112 and 122 are coupled to the gate of the amplification transistor 151 through the floating diffusion layer 130. It is to be noted that the floating diffusion layer 130 is coupled to the power source (VDD) through the source or the drain of the reset transistor 153. The amplification transistor 151 is coupled in series to the selection transistor 152, and the source or the drain of the amplification transistor 151 is coupled to the power source (VDD), and the source or the drain of the selection transistor 152 is coupled to an output (VOUT).

In such a circuit, first, electric charges photoelectrically converted by the photoelectric conversion elements 112 and 122 are outputted to the floating diffusion layer 130 by a potential difference between the ground and the VDD. The outputted electric charges are accumulated in the floating diffusion layer 130, thereby increasing the voltage applied to the gate of the amplification transistor 151. Thus, the amplification transistor 151 goes into on-state. In a case where a pixel signal corresponding to the circuit is read out, putting the selection transistor 152 into on-state establishes electrical coupling from the power source (VDD) to the output (VOUT). Thus, a current signal corresponding to the amount of electric charges accumulated in the floating diffusion layer 130 is outputted from the output (VOUT).

Furthermore, after the output of the current signal, the reset transistor 153 goes into on-state. This causes the electric charges accumulated in the floating diffusion layer 130 to be discharged, and causes the electric potential of the floating diffusion layer 130 to be reset to the electric potential of the power source (VDD). Thus, the floating diffusion layer 130 is put into a state before the accumulation of the electric charges photoelectrically converted by the photoelectric conversion elements 112 and 122.

Subsequently, a specific example of wiring coupling in each of the first pixel 100 and the second pixel 200 is described with reference to FIG. 3D. FIG. 3D is a plan view illustrating a planar configuration of respective wiring lines in the first pixel 100 and the second pixel 200.

FIG. 3D illustrates a specific example of wiring coupling in a case where the first pixel 100 and the second pixel 200 are adjacent to each other. It is to be noted that, in FIG. 3D, the second pixel 200 has a substantially similar configuration to that of the first pixel 100 except that the array direction of the pair of sub-pixels 210 and 220 is different. Specifically, the second pixel 200 includes the pair of sub-pixels 210 and 220, vertical gate electrodes 211 and 221, a floating diffusion layer 230, a pixel wiring line 240, an amplification transistor 251, a selection transistor 252, a reset transistor 253, and a dummy gate 254. These components are substantially similar to those having the same names described in the first pixel 100.

As illustrated in FIG. 3D, in the first pixel 100, the pixel wiring line 140 is provided in a hook shape bent at a right angle. The pixel wiring line 140 is electrically coupled to the floating diffusion layer 130 at a contact 163 provided at the apex of the hook shape, and is electrically coupled to the gate electrode of the amplification transistor 151 at a contact 162 provided at one end of the hook shape. Meanwhile, in the second pixel 200, the pixel wiring line 240 is also provided in a hook shape bent at a right angle. The pixel wiring line 240 is electrically coupled to the floating diffusion layer 230 at a contact 263 provided at the apex of the hook shape, and is electrically coupled to the gate electrode of the amplification transistor 251 at a contact 262 provided at one end of the hook shape.

Furthermore, in the first pixel 100, gate wiring lines 141 and 142 are provided in the shape of line segments parallel to each other. The gate wiring lines 141 and 142 are used to control a transfer transistor to turn the transfer transistor on/off. The transfer transistor controls the transfer of respective electric charges from the pair of sub-pixels 110 and 120. The gate wiring line 141 is electrically coupled to the vertical gate electrode 111 at a contact 161, and the gate wiring line 142 is electrically coupled to the vertical gate electrode 121 at a contact 164. It is to be noted that the contact 161 and the contact 164 are provided to be located on a diagonal line of the first pixel 100. The gate wiring lines 141 and 142 are provided on the same layer as the pixel wiring line 140, and therefore are provided not to overlap each other. That is, the pixel wiring line 140 is provided on the third quadrant side of the first pixel 100; the gate wiring line 141 is provided on the first and second quadrant sides; and the gate wiring line 142 is provided on the fourth quadrant side. The gate wiring lines 141 and 142 are electrically coupled to inter-pixel wiring lines 310 and 320 provided on a further upper layer through vias 171 and 172, respectively.

Meanwhile, in the second pixel 200, gate wiring lines 241 and 242 are also provided in the shape of line segments parallel to each other. The gate wiring lines 241 and 242 are used to control a transfer transistor to turn the transfer transistor on/off. The transfer transistor controls the transfer of respective electric charges from the pair of sub-pixels 210 and 220. The gate wiring line 241 is electrically coupled to the vertical gate electrode 211 at a contact 261, and the gate wiring line 242 is electrically coupled to the vertical gate electrode 221 at a contact 264. It is to be noted that the contact 261 and the contact 264 are provided to be located on a diagonal line of the second pixel 200. The gate wiring lines 241 and 242 are provided on the same layer as the pixel wiring line 240, and therefore are provided not to overlap each other. That is, the pixel wiring line 240 is provided on the third quadrant side of the second pixel 200; the gate wiring line 241 is provided on the first and second quadrant sides; and the gate wiring line 242 is provided on the fourth quadrant side. The gate wiring lines 241 and 242 are electrically coupled to inter-pixel wiring lines 310 and 320 provided on a further upper layer through vias 271 and 272, respectively.

As illustrated in FIG. 3D, the array directions of the respective pairs of sub-pixels in the first pixel 100 and the second pixel 200 are perpendicular to each other. Here, providing contacts to the respective vertical gate electrodes provided in the pair of sub-pixels on a diagonal line of each pixel makes it possible to couple respective elements in the first pixel 100 and the second pixel 200 in the same wiring configuration. Specifically, it is possible to provide the pixel wiring line 140 and the gate wiring lines 141 and 142 and the pixel wiring line 240 and the gate wiring lines 241 and 242 in the same shape. Furthermore, it is possible to provide the inter-pixel wiring lines 310 and 320 provided over the first pixel 100 and the second pixel 200 in the shape of straight lines that extend in one direction. According to this, the first pixel 100 and the second pixel 200 are provided with wiring lines in the same shape, and therefore there is no difference in conversion efficiency on parasitic capacitance. Furthermore, even in a case where the disposition of the first pixels 100 and the second pixels 200 is changed, simply changing the configuration of the transistors of the semiconductor substrate 50 makes it possible to handle the case without changing the wiring lines.

2. MODIFICATION EXAMPLES

In the following, modification examples of the present embodiment are described with reference to FIGS. 4, 5A, 5B, 6, 7, and 8.

First Modification Example

First, a modification example (a first modification example) of the configuration of the sub-pixel described in FIG. 2 is described with reference to FIG. 4. FIG. 4 is a longitudinal cross-sectional view illustrating a modification example of a configuration of one sub-pixel.

As illustrated in FIG. 4, sub-pixels included in the first pixel 100, the second pixel 200, etc. each include the photoelectric conversion element 11, an extraction region 16, a transfer transistor 15, the floating diffusion layer 13, and the pixel control transistor 14 that are embedded in the semiconductor substrate 50.

In the modification example illustrated in FIG. 4, unlike the structure illustrated in FIG. 2, the transfer transistor 15 does not have a vertical gate structure, but has a planar gate structure in which the gate is provided on the surface of the semiconductor substrate 50. Furthermore, the sub-pixel is provided with the extraction region 16 that extends from the photoelectric conversion element 11 toward the surface of the semiconductor substrate 50. It is to be noted that the other components have been described in FIG. 2, and thus description is omitted here.

The extraction region 16 is an n-type semiconductor region, and extracts electrons generated in the n-type semiconductor region of the photoelectric conversion element 11 onto the surface of the semiconductor substrate 50. Thus, the transfer transistor 15 is able to cause the electrode provided on the surface of the semiconductor substrate 50 to function as a gate and cause the extraction region 16 and the floating diffusion layer 13 to function as a source or drain region. That is, in a case where a voltage equal to or higher than the threshold voltage is applied to the gate electrode provided on the surface of the semiconductor substrate 50, the transfer transistor 15 is able to form a channel between the extraction region 16 and the floating diffusion layer 13 near the surface of the semiconductor substrate 50. This allows the transfer transistor 15 to transfer the electrons generated in the photoelectric conversion element 11 to the floating diffusion layer 13 through the extraction region 16.

Second Modification Example

Next, a modification example (a second modification example) of the specific configuration of the pixel array 500 is described with reference to FIGS. 5A and 5B. FIG. 5A is a plan view illustrating a modification example of a planar configuration including multiple pixels, and FIG. 5B is a circuit diagram illustrating an equivalent circuit of the configuration illustrated in FIG. 5A.

As illustrated in FIG. 5A, in the pixel array 500, respective floating diffusion layers 131 and 132 of two pixels are electrically coupled by the pixel wiring line 140, thereby sharing the pixel transistor group 150 subsequent to the amplification transistor between the two pixels.

Specifically, in the pixel array 500, the floating diffusion layer 131 that accumulates electric charges photoelectrically converted by a pair of sub-pixels 110A and 120A of a first pixel 101 and the floating diffusion layer 132 that accumulates electric charges photoelectrically converted by a pair of sub-pixels 110B and 120B of a first pixel 102 are electrically coupled by the pixel wiring line 140. This causes the floating diffusion layer 131, the floating diffusion layer 132, and the pixel wiring line 140 to be at the same potential, and therefore it is possible to cause the whole of the floating diffusion layer 131, the floating diffusion layer 132, and the pixel wiring line 140 to function as one floating diffusion. This allows the two first pixels 101 and 102 to share the pixel transistor group 150 (i.e., the amplification transistor, the selection transistor, and the reset transistor) included in a circuit subsequent to the floating diffusion; therefore, it is possible to reduce the area occupied by a signal processing circuit and expand the area occupied by the pixels.

Furthermore, the same applies to a case where a signal processing circuit is shared between a first pixel 103 and a second pixel 201.

Specifically, a floating diffusion layer 133 that accumulates electric charges photoelectrically converted by a pair of sub-pixels 110C and 120C of the first pixel 103 and the floating diffusion layer 230 that accumulates electric charges photoelectrically converted by the pair of sub-pixels 210 and 220 of the second pixel 201 are electrically coupled by the pixel wiring line 240. This causes the floating diffusion layer 133, the floating diffusion layer 230, and the pixel wiring line 240 to be at the same potential, and therefore it is possible to cause the whole of the floating diffusion layer 133, the floating diffusion layer 230, and the pixel wiring line 140 to function as one floating diffusion. This allows the two of the first pixel 103 and the second pixel 201 to share the pixel transistor group 250 (i.e., the amplification transistor, the selection transistor, and the reset transistor) included in a circuit subsequent to the floating diffusion; therefore, it is possible to reduce the area occupied by a signal processing circuit and expand the area occupied by the pixels.

FIG. 5B illustrates an equivalent circuit of respective circuits of the first pixels 101 and 102 that share the signal processing circuit described in FIG. 5A.

As illustrated in FIG. 5B, in the sub-pixels 110A, 120A, 110B, and 120B, the floating diffusion layers 131 and 132 and the pixel wiring line 140 are caused to function as a floating diffusion, and are coupled to the gate of the amplification transistor 151. The floating diffusion is coupled to the power source (VDD) through the source or the drain of the reset transistor 153. The amplification transistor 151 is coupled in series to the selection transistor 152, and the source or the drain of the amplification transistor 151 is coupled to the power source (VDD), and the source or the drain of the selection transistor 152 is coupled to an output (VOUT).

In such a circuit, first, electric charges photoelectrically converted by the respective sub-pixels 110A, 120A, 110B, and 120B are outputted to the floating diffusion layers 131 and 132 by a potential difference between the ground and the VDD. The outputted electric charges are accumulated over the floating diffusion layers 131 and 132 and the pixel wiring line 140, thereby increasing the voltage applied to the gate of the amplification transistor 151. Thus, the amplification transistor 151 goes into on-state. In a case where a pixel signal corresponding to the circuit is read out, putting the selection transistor 152 into on-state establishes electrical coupling from the power source (VDD) to the output (VOUT). Thus, a current signal corresponding to the amount of electric charges accumulated over the floating diffusion layers 131 and 132 and the pixel wiring line 140 is outputted from the output (VOUT).

Furthermore, after the output of the current signal, the reset transistor 153 goes into on-state. This causes the electric charges accumulated over the floating diffusion layers 131 and 132 and the pixel wiring line 140 to be discharged, and causes the electric potential of the floating diffusion layers 131 and 132 to be reset to the electric potential of the power source (VDD). Thus, the floating diffusion layers 131 and 132 are put into a state before the accumulation of the electric charges.

Third Modification Example

Subsequently, a modification example (a third modification example) of the specific configuration of the pixel array 500 is described with reference to FIG. 6. FIG. 6 is a plan view illustrating a modification example of the planar configuration including the multiple pixels.

As illustrated in FIG. 6, in the pixel array 500, the floating diffusion layer 130 is provided on a boundary between two pixels, thereby sharing the pixel transistor group 150 included in a circuit subsequent to the floating diffusion layer 130 between the two pixels.

Specifically, the electric charges photoelectrically converted by the pair of sub-pixels 110A and 120A of the first pixel 101 and the electric charges photoelectrically converted by the pair of sub-pixels 110B and 120B of the first pixel 102 are accumulated in the floating diffusion layer 130 provided on the boundary between the first pixels 101 and 102. Furthermore, the floating diffusion layer 130 is electrically coupled to the pixel transistor group 150 including the amplification transistor and the reset transistor by the pixel wiring line 140. This allows the two first pixels 101 and 102 to share the floating diffusion layer 130 and the pixel transistor group 150 (i.e., the amplification transistor, the selection transistor, and the reset transistor); therefore, it is possible to reduce the area occupied by a signal processing circuit and expand the area occupied by the pixels.

Furthermore, the same applies to a case where a signal processing circuit is shared between the second pixels 201 and 202.

Specifically, the electric charges photoelectrically converted by the pair of sub-pixels 210A and 220A of the second pixel 201 and the electric charges photoelectrically converted by the pair of sub-pixels 210B and 220B of the second pixel 202 are accumulated in the floating diffusion layer 230 provided on the boundary between the second pixels 201 and 202. Furthermore, the floating diffusion layer 230 is electrically coupled to the pixel transistor group 250 including the amplification transistor and the reset transistor by the pixel wiring line 240. This allows the two second pixels 201 and 202 to share the floating diffusion layer 230 and the pixel transistor group 250 (i.e., the amplification transistor, the selection transistor, and the reset transistor); therefore, it is possible to reduce the area occupied by a signal processing circuit and expand the area occupied by the pixels.

Fourth Modification Example

Next, a modification example (a fourth modification example) of the specific configuration of the pixel array 500 is described with reference to FIG. 7. FIG. 7 is a plan view illustrating a modification example of the planar configuration of the pixel array 500.

As illustrated in FIG. 7, the pixel array 500 may be provided to be tilted with respect to the solid-state imaging device. Specifically, the pixel array 500 may be provided to be tilted by 45° with respect to a horizontal direction of the solid-state imaging device. In such a case, the pair of sub-pixels 110 and 120 of the first pixel 100 is provided to be arrayed, for example, in a direction tilted clockwise by 45° with respect to the horizontal direction of the solid-state imaging device. Furthermore, the pair of sub-pixels 110 and 120 of the second pixel 200 is provided to be arrayed, for example, in a direction tilted counterclockwise by 45° with respect to the horizontal direction of the solid-state imaging device.

In the solid-state imaging device according to the present embodiment, it is possible to adopt such a planar configuration of the pixel array 500. That is, the pixel array 500 included in the solid-state imaging device according to the present embodiment may have a planar configuration other than the planar configuration in which respective pixels are arrayed in a matrix.

Fifth Modification Example

Next, a modification example (a fifth modification example) of the specific configuration of the pixel array 500 is described with reference to FIG. 8. FIG. 8 is a plan view illustrating a modification example of the planar configuration of the pixel array 500.

As illustrated in FIG. 8, the pixel array 500 may be provided to be tilted with respect to the solid-state imaging device. Specifically, the pixel array 500 may be provided to be tilted by 45° with respect to a horizontal direction of the solid-state imaging device. However, unlike the fourth modification example, the pair of sub-pixels 110 and 120 of the first pixel 100 is provided to be arrayed in a direction vertical to the horizontal direction of the solid-state imaging device, and the pair of sub-pixels 110 and 120 of the second pixel 200 is provided to be arrayed in the horizontal direction of the solid-state imaging device. In such a case, the planar shape of the pair of sub-pixels of each pixel may be, for example, an isosceles right triangle obtained by cutting a square along a diagonal line.

In the solid-state imaging device according to the present embodiment, it is possible to adopt such a planar configuration of the pixel array 500. That is, in the pixel array 500 included in the solid-state imaging device according to the present embodiment, the pair of sub-pixels may have a shape other than a rectangle obtained by dividing a square into halves.

It is to be noted that it is possible to combine the above-described first to fifth modification examples within the scope that they do not contradict, and these are also included in the scope of the technology according to the present disclosure. For example, it is also possible to combine the first modification example with the second to fifth modification examples. Furthermore, in the second to fifth modification examples, some of the planar configurations according to the second to fifth modification examples may be included in the same pixel array 500.

3. APPLICATION EXAMPLES (3.1. Electronic Apparatus)

The solid-state imaging device according to the embodiment of the present disclosure is applicable to, for example, imaging sections installed in various electronic apparatuses. Subsequently, with reference to FIGS. 9A, 9B, and 9C, an example of an electronic apparatus to which the solid-state imaging device according to the present embodiment is applicable is described. Each of FIGS. 9A, 9B, and 9C is an appearance view illustrating an example of the electronic apparatus to which the solid-state imaging device according to the embodiment is applicable.

For example, the solid-state imaging device according to the present embodiment is applicable to an imaging section installed in an electronic apparatus such as a smartphone. Specifically, as illustrated in FIG. 9A, a smartphone 900 includes a display section 901 that displays various types of information and an operation section 903 including a button or the like for receiving an operation input from a user. Here, the solid-state imaging device according to the present embodiment may be applied to an imaging section included in the smartphone 900.

For example, the solid-state imaging device according to the present embodiment is applicable to an imaging section installed in an electronic apparatus such as a digital camera. Specifically, as illustrated in FIGS. 9B and 9C, a digital camera 910 includes a main body (camera body) 911, an interchangeable lens unit 913, a grip 915 to be gripped by the user at the time of photographing, a monitor 917 that displays various types of information, and EVF (Electronic View Finder) 919 that displays a through image viewed by the user at the time of photographing. It is to be noted that FIG. 9B is an appearance view of the digital camera 910 as seen from the front side (i.e., from an object side), and FIG. 9C is an appearance view of the digital camera 910 as seen from the back side (i.e. from a photographer side). Here, the solid-state imaging device according to the present embodiment may be applied to an imaging section of the digital camera 910.

It is to be noted that the electronic apparatus to which the solid-state imaging device according to the present embodiment is applied is not limited to the above-described examples. The solid-state imaging device according to the present embodiment is applicable to imaging sections installed in electronic apparatuses in all fields. Examples of such electronic apparatuses include a glass-shaped wearable device, HMD (Head Mounted Display), a television apparatus, an electronic book, PDA (Personal Digital Assistant), a notebook personal computer, a video camera, a gaming console, or the like.

(3.2. Endoscopic Surgery System)

For example, the technology according to the present disclosure may be applied to an endoscopic surgery system.

FIG. 10 is a view depicting an example of a schematic configuration of an endoscopic surgery system to which the technology according to an embodiment of the present disclosure (present technology) can be applied.

In FIG. 10, a state is illustrated in which a surgeon (medical doctor) 11131 is using an endoscopic surgery system 11000 to perform surgery for a patient 11132 on a patient bed 11133. As depicted, the endoscopic surgery system 11000 includes an endoscope 11100, other surgical tools 11110 such as a pneumoperitoneum tube 11111 and an energy device 11112, a supporting arm apparatus 11120 which supports the endoscope 11100 thereon, and a cart 11200 on which various apparatus for endoscopic surgery are mounted.

The endoscope 11100 includes a lens barrel 11101 having a region of a predetermined length from a distal end thereof to be inserted into a body cavity of the patient 11132, and a camera head 11102 connected to a proximal end of the lens barrel 11101. In the example depicted, the endoscope 11100 is depicted which includes as a rigid endoscope having the lens barrel 11101 of the hard type. However, the endoscope 11100 may otherwise be included as a flexible endoscope having the lens barrel 11101 of the flexible type.

The lens barrel 11101 has, at a distal end thereof, an opening in which an objective lens is fitted. A light source apparatus 11203 is connected to the endoscope 11100 such that light generated by the light source apparatus 11203 is introduced to a distal end of the lens barrel 11101 by a light guide extending in the inside of the lens barrel 11101 and is irradiated toward an observation target in a body cavity of the patient 11132 through the objective lens. It is to be noted that the endoscope 11100 may be a forward-viewing endoscope or may be an oblique-viewing endoscope or a side-viewing endoscope.

An optical system and an image pickup element are provided in the inside of the camera head 11102 such that reflected light (observation light) from the observation target is condensed on the image pickup element by the optical system. The observation light is photoelectrically converted by the image pickup element to generate an electric signal corresponding to the observation light, namely, an image signal corresponding to an observation image. The image signal is transmitted as RAW data to a CCU 11201.

The CCU 11201 includes a central processing unit (CPU), a graphics processing unit (GPU) or the like and integrally controls operation of the endoscope 11100 and a display apparatus 11202. Further, the CCU 11201 receives an image signal from the camera head 11102 and performs, for the image signal, various image processes for displaying an image based on the image signal such as, for example, a development process (demosaic process).

The display apparatus 11202 displays thereon an image based on an image signal, for which the image processes have been performed by the CCU 11201, under the control of the CCU 11201.

The light source apparatus 11203 includes a light source such as, for example, a light emitting diode (LED) and supplies irradiation light upon imaging of a surgical region to the endoscope 11100.

An inputting apparatus 11204 is an input interface for the endoscopic surgery system 11000. A user can perform inputting of various kinds of information or instruction inputting to the endoscopic surgery system 11000 through the inputting apparatus 11204. For example, the user would input an instruction or a like to change an image pickup condition (type of irradiation light, magnification, focal distance or the like) by the endoscope 11100.

A treatment tool controlling apparatus 11205 controls driving of the energy device 11112 for cautery or incision of a tissue, sealing of a blood vessel or the like. A pneumoperitoneum apparatus 11206 feeds gas into a body cavity of the patient 11132 through the pneumoperitoneum tube 11111 to inflate the body cavity in order to secure the field of view of the endoscope 11100 and secure the working space for the surgeon. A recorder 11207 is an apparatus capable of recording various kinds of information relating to surgery. A printer 11208 is an apparatus capable of printing various kinds of information relating to surgery in various forms such as a text, an image or a graph.

It is to be noted that the light source apparatus 11203 which supplies irradiation light when a surgical region is to be imaged to the endoscope 11100 may include a white light source which includes, for example, an LED, a laser light source or a combination of them. Where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 11203. Further, in this case, if laser beams from the respective RGB laser light sources are irradiated time-divisionally on an observation target and driving of the image pickup elements of the camera head 11102 are controlled in synchronism with the irradiation timings. Then images individually corresponding to the R, G and B colors can be also picked up time-divisionally. According to this method, a color image can be obtained even if color filters are not provided for the image pickup element.

Further, the light source apparatus 11203 may be controlled such that the intensity of light to be outputted is changed for each predetermined time. By controlling driving of the image pickup element of the camera head 11102 in synchronism with the timing of the change of the intensity of light to acquire images time-divisionally and synthesizing the images, an image of a high dynamic range free from underexposed blocked up shadows and overexposed highlights can be created.

Further, the light source apparatus 11203 may be configured to supply light of a predetermined wavelength band ready for special light observation. In special light observation, for example, by utilizing the wavelength dependency of absorption of light in a body tissue to irradiate light of a narrow band in comparison with irradiation light upon ordinary observation (namely, white light), narrow band observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 11203 can be configured to supply such narrow-band light and/or excitation light suitable for special light observation as described above.

FIG. 11 is a block diagram depicting an example of a functional configuration of the camera head 11102 and the CCU 11201 depicted in FIG. 10.

The camera head 11102 includes a lens unit 11401, an image pickup unit 11402, a driving unit 11403, a communication unit 11404 and a camera head controlling unit 11405. The CCU 11201 includes a communication unit 11411, an image processing unit 11412 and a control unit 11413. The camera head 11102 and the CCU 11201 are connected for communication to each other by a transmission cable 11400.

The lens unit 11401 is an optical system, provided at a connecting location to the lens barrel 11101. Observation light taken in from a distal end of the lens barrel 11101 is guided to the camera head 11102 and introduced into the lens unit 11401. The lens unit 11401 includes a combination of a plurality of lenses including a zoom lens and a focusing lens.

The number of image pickup elements which is included by the image pickup unit 11402 may be one (single-plate type) or a plural number (multi-plate type). Where the image pickup unit 11402 is configured as that of the multi-plate type, for example, image signals corresponding to respective R, G and B are generated by the image pickup elements, and the image signals may be synthesized to obtain a color image. The image pickup unit 11402 may also be configured so as to have a pair of image pickup elements for acquiring respective image signals for the right eye and the left eye ready for three dimensional (3D) display. If 3D display is performed, then the depth of a living body tissue in a surgical region can be comprehended more accurately by the surgeon 11131. It is to be noted that, where the image pickup unit 11402 is configured as that of stereoscopic type, a plurality of systems of lens units 11401 are provided corresponding to the individual image pickup elements.

Further, the image pickup unit 11402 may not necessarily be provided on the camera head 11102. For example, the image pickup unit 11402 may be provided immediately behind the objective lens in the inside of the lens barrel 11101.

The driving unit 11403 includes an actuator and moves the zoom lens and the focusing lens of the lens unit 11401 by a predetermined distance along an optical axis under the control of the camera head controlling unit 11405. Consequently, the magnification and the focal point of a picked up image by the image pickup unit 11402 can be adjusted suitably.

The communication unit 11404 includes a communication apparatus for transmitting and receiving various kinds of information to and from the CCU 11201. The communication unit 11404 transmits an image signal acquired from the image pickup unit 11402 as RAW data to the CCU 11201 through the transmission cable 11400.

In addition, the communication unit 11404 receives a control signal for controlling driving of the camera head 11102 from the CCU 11201 and supplies the control signal to the camera head controlling unit 11405. The control signal includes information relating to image pickup conditions such as, for example, information that a frame rate of a picked up image is designated, information that an exposure value upon image picking up is designated and/or information that a magnification and a focal point of a picked up image are designated.

It is to be noted that the image pickup conditions such as the frame rate, exposure value, magnification or focal point may be designated by the user or may be set automatically by the control unit 11413 of the CCU 11201 on the basis of an acquired image signal. In the latter case, an auto exposure (AE) function, an auto focus (AF) function and an auto white balance (AWB) function are incorporated in the endoscope 11100.

The camera head controlling unit 11405 controls driving of the camera head 11102 on the basis of a control signal from the CCU 11201 received through the communication unit 11404.

The communication unit 11411 includes a communication apparatus for transmitting and receiving various kinds of information to and from the camera head 11102. The communication unit 11411 receives an image signal transmitted thereto from the camera head 11102 through the transmission cable 11400.

Further, the communication unit 11411 transmits a control signal for controlling driving of the camera head 11102 to the camera head 11102. The image signal and the control signal can be transmitted by electrical communication, optical communication or the like.

The image processing unit 11412 performs various image processes for an image signal in the form of RAW data transmitted thereto from the camera head 11102.

The control unit 11413 performs various kinds of control relating to image picking up of a surgical region or the like by the endoscope 11100 and display of a picked up image obtained by image picking up of the surgical region or the like. For example, the control unit 11413 creates a control signal for controlling driving of the camera head 11102.

Further, the control unit 11413 controls, on the basis of an image signal for which image processes have been performed by the image processing unit 11412, the display apparatus 11202 to display a picked up image in which the surgical region or the like is imaged. Thereupon, the control unit 11413 may recognize various objects in the picked up image using various image recognition technologies. For example, the control unit 11413 can recognize a surgical tool such as forceps, a particular living body region, bleeding, mist when the energy device 11112 is used and so forth by detecting the shape, color and so forth of edges of objects included in a picked up image. The control unit 11413 may cause, when it controls the display apparatus 11202 to display a picked up image, various kinds of surgery supporting information to be displayed in an overlapping manner with an image of the surgical region using a result of the recognition. Where surgery supporting information is displayed in an overlapping manner and presented to the surgeon 11131, the burden on the surgeon 11131 can be reduced and the surgeon 11131 can proceed with the surgery with certainty.

The transmission cable 11400 which connects the camera head 11102 and the CCU 11201 to each other is an electric signal cable ready for communication of an electric signal, an optical fiber ready for optical communication or a composite cable ready for both of electrical and optical communications.

Here, while, in the example depicted, communication is performed by wired communication using the transmission cable 11400, the communication between the camera head 11102 and the CCU 11201 may be performed by wireless communication.

An example of the endoscopic surgery system to which the technology according to the present disclosure may be applied has been described above. The technology according to the present disclosure may be applied to, for example, the endoscope 11100 or the camera head 11102 among the components described above. Specifically, the solid-state imaging device according to the present embodiment is applicable to the endoscope 11100 or the image pickup unit 11402 of the camera head 11102. Applying the technology according to the present disclosure to the image pickup unit 11402, etc. makes it possible to simultaneously acquire polarization information and image information of an object to be observed with high accuracy, and therefore, a surgeon is able to visually recognize a surgical site image including more detailed information.

It should be noted that the endoscopic surgery system has been described here as an example, but the technology according to the present disclosure may be additionally applied to, for example, a microscopic surgery system or the like.

(3.3. In-Vivo Information Acquisition System)

For example, the technology according to the present disclosure may be applied to an in-vivo information acquisition system.

FIG. 12 is a block diagram depicting an example of a schematic configuration of an in-vivo information acquisition system of a patient using a capsule type endoscope, to which the technology according to an embodiment of the present disclosure (present technology) can be applied.

The in-vivo information acquisition system 10001 includes a capsule type endoscope 10100 and an external controlling apparatus 10200.

The capsule type endoscope 10100 is swallowed by a patient at the time of inspection. The capsule type endoscope 10100 has an image pickup function and a wireless communication function and successively picks up an image of the inside of an organ such as the stomach or an intestine (hereinafter referred to as in-vivo image) at predetermined intervals while it moves inside of the organ by peristaltic motion for a period of time until it is naturally discharged from the patient. Then, the capsule type endoscope 10100 successively transmits information of the in-vivo image to the external controlling apparatus 10200 outside the body by wireless transmission.

The external controlling apparatus 10200 integrally controls operation of the in-vivo information acquisition system 10001. Further, the external controlling apparatus 10200 receives information of an in-vivo image transmitted thereto from the capsule type endoscope 10100 and generates image data for displaying the in-vivo image on a display apparatus (not depicted) on the basis of the received information of the in-vivo image.

In the in-vivo information acquisition system 10001, an in-vivo image imaged a state of the inside of the body of a patient can be acquired at any time in this manner for a period of time until the capsule type endoscope 10100 is discharged after it is swallowed.

A configuration and functions of the capsule type endoscope 10100 and the external controlling apparatus 10200 are described in more detail below.

The capsule type endoscope 10100 includes a housing 10101 of the capsule type, in which a light source unit 10111, an image pickup unit 10112, an image processing unit 10113, a wireless communication unit 10114, a power feeding unit 10115, a power supply unit 10116 and a control unit 10117 are accommodated.

The light source unit 10111 includes a light source such as, for example, a light emitting diode (LED) and irradiates light on an image pickup field-of-view of the image pickup unit 10112.

The image pickup unit 10112 includes an image pickup element and an optical system including a plurality of lenses provided at a preceding stage to the image pickup element. Reflected light (hereinafter referred to as observation light) of light irradiated on a body tissue which is an observation target is condensed by the optical system and introduced into the image pickup element. In the image pickup unit 10112, the incident observation light is photoelectrically converted by the image pickup element, by which an image signal corresponding to the observation light is generated. The image signal generated by the image pickup unit 10112 is provided to the image processing unit 10113.

The image processing unit 10113 includes a processor such as a central processing unit (CPU) or a graphics processing unit (GPU) and performs various signal processes for an image signal generated by the image pickup unit 10112. The image processing unit 10113 provides the image signal for which the signal processes have been performed thereby as RAW data to the wireless communication unit 10114.

The wireless communication unit 10114 performs a predetermined process such as a modulation process for the image signal for which the signal processes have been performed by the image processing unit 10113 and transmits the resulting image signal to the external controlling apparatus 10200 through an antenna 10114A. Further, the wireless communication unit 10114 receives a control signal relating to driving control of the capsule type endoscope 10100 from the external controlling apparatus 10200 through the antenna 10114A. The wireless communication unit 10114 provides the control signal received from the external controlling apparatus 10200 to the control unit 10117.

The power feeding unit 10115 includes an antenna coil for power reception, a power regeneration circuit for regenerating electric power from current generated in the antenna coil, a voltage booster circuit and so forth. The power feeding unit 10115 generates electric power using the principle of non-contact charging.

The power supply unit 10116 includes a secondary battery and stores electric power generated by the power feeding unit 10115. In FIG. 12, in order to avoid complicated illustration, an arrow mark indicative of a supply destination of electric power from the power supply unit 10116 and so forth are omitted. However, electric power stored in the power supply unit 10116 is supplied to and can be used to drive the light source unit 10111, the image pickup unit 10112, the image processing unit 10113, the wireless communication unit 10114 and the control unit 10117.

The control unit 10117 includes a processor such as a CPU and suitably controls driving of the light source unit 10111, the image pickup unit 10112, the image processing unit 10113, the wireless communication unit 10114 and the power feeding unit 10115 in accordance with a control signal transmitted thereto from the external controlling apparatus 10200.

The external controlling apparatus 10200 includes a processor such as a CPU or a GPU, a microcomputer, a control board or the like in which a processor and a storage element such as a memory are mixedly incorporated. The external controlling apparatus 10200 transmits a control signal to the control unit 10117 of the capsule type endoscope 10100 through an antenna 10200A to control operation of the capsule type endoscope 10100. In the capsule type endoscope 10100, an irradiation condition of light upon an observation target of the light source unit 10111 can be changed, for example, in accordance with a control signal from the external controlling apparatus 10200. Further, an image pickup condition (for example, a frame rate, an exposure value or the like of the image pickup unit 10112) can be changed in accordance with a control signal from the external controlling apparatus 10200. Further, the substance of processing by the image processing unit 10113 or a condition for transmitting an image signal from the wireless communication unit 10114 (for example, a transmission interval, a transmission image number or the like) may be changed in accordance with a control signal from the external controlling apparatus 10200.

Further, the external controlling apparatus 10200 performs various image processes for an image signal transmitted thereto from the capsule type endoscope 10100 to generate image data for displaying a picked up in-vivo image on the display apparatus. As the image processes, various signal processes can be performed such as, for example, a development process (demosaic process), an image quality improving process (bandwidth enhancement process, a super-resolution process, a noise reduction (NR) process and/or image stabilization process) and/or an enlargement process (electronic zooming process). The external controlling apparatus 10200 controls driving of the display apparatus to cause the display apparatus to display a picked up in-vivo image on the basis of generated image data. Alternatively, the external controlling apparatus 10200 may also control a recording apparatus (not depicted) to record generated image data or control a printing apparatus (not depicted) to output generated image data by printing.

An example of the in-vivo information acquisition system to which the technology according to the present disclosure may be applied has been described above. The technology according to the present disclosure may be applied to the image pickup unit 10112 among the components described above. Specifically, the solid-state imaging device according to the present embodiment is applicable to the image pickup unit 10112. Applying the technology according to the present disclosure to the image pickup unit 10112 makes it possible to simultaneously acquire polarization information and image information of an object to be observed with high accuracy, and this makes it possible to obtain more detailed inspection information.

<3.4. Mobile Body>

For example, the technology according to the present disclosure may be achieved as a device installed in any type of mobile body such as an automobile, an electric vehicle, a hybrid electric vehicle, a motorcycle, a bicycle, a personal mobility, an airplane, a drone, a vessel, or a robot.

FIG. 13 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 13, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 13, an audio speaker 12061, a display section 12062, and an instrument panel 12063 are illustrated as the output device. The display section 12062 may, for example, include at least one of an on-board display and a head-up display.

FIG. 14 is a diagram depicting an example of the installation position of the imaging section 12031.

In FIG. 14, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 14 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure may be applied has been described above. The technology according to the present disclosure may be applied to the imaging section 12031 among the components described above. Specifically, the solid-state imaging device according to the present embodiment is applicable to the imaging section 12031. Applying the technology according to the present disclosure to the imaging section 12031 makes it possible to simultaneously acquire polarization information and image information with high accuracy, and therefore, a driver is able to visually recognize a captured image including more detailed information.

A preferred embodiment(s) of the present disclosure has/have been described above in detail with reference to the accompanying drawings, but the technical scope of the present disclosure is not limited to such an embodiment(s). It is apparent that a person having ordinary skill in the art of the present disclosure may arrive at various alterations and modifications within the scope of the technical idea described in the appended claims, and it is understood that such alterations and modifications naturally fall within the technical scope of the present disclosure.

Furthermore, the effects described herein are merely illustrative and exemplary, and not limitative. That is, the technology according to the present disclosure may exert other effects that are apparent to those skilled in the art from the description herein, in addition to the above-described effects or in place of the above-described effects.

It is to be noted that the following configurations also fall within the technical scope of the present disclosure.

(1)
A solid-state imaging device including
a pixel array in which multiple pixels are arrayed, the multiple pixels each receiving light in a predetermined wavelength band,
the pixel array including
at least one or more first pixels each including a pair of sub-pixels provided beneath one microlens, the pair of sub-pixels being aligned in a first direction, and
at least one or more second pixels each including a pair of sub-pixels provided beneath one microlens, the pair of sub-pixels being aligned in a second direction, the second direction being perpendicular to the first direction.

(2)
The solid-state imaging device according to (1), in which planar shapes obtained by combining the respective pairs of sub-pixels of the first pixel and the second pixel are identical.

(3)
The solid-state imaging device according to (1) or (2), in which planar shapes obtained by combining the respective pairs of sub-pixels of the first pixel and the second pixel are fourfold symmetric shapes.

(4)
The solid-state imaging device according to any one of (1) to (3), in which planar shapes of respective sub-pixels included in the pair of sub-pixels included in each of the first pixel and the second pixel are identical with each other.

(5)
The solid-state imaging device according to any one of (1) to (4), in which the first pixel and the second pixel each include
a photoelectric conversion section provided for each of sub-pixels included in the pair of sub-pixels, the photoelectric conversion section converting received light into an electric charge, and
a signal processing circuit including an FD section that accumulates an electric charge outputted from each photoelectric conversion section, an amplification transistor that is controlled by the electric charge to turn on/off, the electric charge being accumulated in the FD section, a selection transistor provided between the amplification transistor and a vertical signal line, and a reset transistor that resets the electric charge accumulated in the FD section.

(6)
The solid-state imaging device according to (5), in which the FD section is shared between respective sub-pixels included in the pair of sub-pixels included in each of the first pixel and the second pixel.

(7)
The solid-state imaging device according to (6), in which the FD section is provided in a center of a planar shape obtained by combining the respective pairs of sub-pixels included in the first pixel and the second pixel.

(8)
The solid-state imaging device according to (7), in which a center of the FD section is substantially identical with a center of the microlens.

(9)
The solid-state imaging device according to (5) or (6), in which the signal processing circuit is shared between two or more pixels including at least any of the first pixels or the second pixels.

(10)
The solid-state imaging device according to any one of (5) to (9), in which each photoelectric conversion section is provided inside a semiconductor substrate provided with the pixel array.

(11)
The solid-state imaging device according to (10), in which each photoelectric conversion section is provided to extend further inside the semiconductor substrate on a planar region provided with the signal processing circuit.

(12)
The solid-state imaging device according to any one of (5) to (11), in which the signal processing circuit is provided around a planar region provided with each photoelectric conversion section.

(13)
The solid-state imaging device according to (12), in which electrodes of the signal processing circuits are provided around regions provided with the respective photoelectric conversion sections to have an identical positional relationship with respective sub-pixels included in the pair of sub-pixels.

(14)
The solid-state imaging device according to (13), in which the electrodes of the signal processing circuit include a dummy electrode electrically coupled to a ground.

(15)
The solid-state imaging device according to any one of (5) to (14), in which the first pixel and the second pixel each have an identical layout of wiring lines of the signal processing circuit.

(16)
The solid-state imaging device according to any one of (1) to (15), in which the first pixel and the second pixel are green pixels that each receive green light.

(17)
An electronic apparatus including
a solid-state imaging device including
a pixel array in which multiple pixels are arrayed, the multiple pixels each receiving light in a predetermined wavelength band,
the pixel array including
at least one or more first pixels each including a pair of sub-pixels provided beneath one microlens, the pair of sub-pixels being aligned in a first direction, and at least one or more second pixels each including a pair of sub-pixels provided beneath one microlens, the pair of sub-pixels being aligned in a second direction, the second direction being perpendicular to the first direction.

REFERENCE SIGNS LIST 11, 112, 122 photoelectric conversion element
12, 15 transfer transistor
13, 130, 230 floating diffusion layer
14 pixel control transistor
50 semiconductor substrate
100 first pixel
110, 120, 210, 220 sub-pixel
111, 121, 211, 221 vertical gate electrode
140, 240 pixel wiring line
150, 250 pixel transistor group
151, 251 amplification transistor
152, 252 selection transistor
153, 253 reset transistor
154, 254 dummy gate
200 second pixel
500 pixel array

The invention claimed is:
1. A solid-state imaging device, comprising:
a pixel array, wherein
  a first plurality of pixels is arrayed in the pixel array,
  each pixel of the first plurality of pixels is configured to receive light in a specific wavelength band,
  at least one first pixel of the first plurality of pixels includes a first pair of sub-pixels beneath a first microlens,
  the first pair of sub-pixels is aligned in a first direction,
  at least one second pixel of the first plurality of pixels includes a second pair of sub-pixels beneath a second microlens,
  the second pair of sub-pixels is aligned in a second direction,
  the second direction is perpendicular to the first direction,
  the first plurality of pixels includes a plurality of signal processing circuits,
  each pixel of the at least one first pixel and the at least one second pixel includes a respective photoelectric conversion section for each sub-pixel included in the first pair of sub-pixels and the second pair of sub-pixels,
  each electrode of a plurality of electrodes of the plurality of signal processing circuits is around a planar region associated with the respective photoelectric conversion section, and
  the plurality of electrodes includes a dummy electrode electrically coupled to ground.
2. The solid-state imaging device according to claim 1, wherein planar shapes obtained based on combination of the first pair of sub-pixels and the second pair of sub-pixels are identical.
3. The solid-state imaging device according to claim 1, wherein planar shapes obtained based on combination of the first pair of sub-pixels and the second pair of sub-pixels are fourfold symmetric shapes.
4. The solid-state imaging device according to claim 1, wherein planar shapes of sub-pixels included in the first pair of sub-pixels are identical with planar shapes of sub-pixels included in the second pair of sub-pixels.

5. The solid-state imaging device according to claim 1, wherein
  the respective photoelectric conversion section is configured to convert the received light into an electric charge,
  each signal processing circuit of the plurality of signal processing circuits includes:
    an FD section configured to accumulate the electric charge outputted from the respective photoelectric conversion section,
    an amplification transistor controlled by the electric charge to turn on/off,
    a selection transistor between the amplification transistor and a vertical signal line, and
    a reset transistor configured to reset the electric charge accumulated in the FD section.
6. The solid-state imaging device according to claim 5, wherein the FD section is shared between respective sub-pixels included in the first pair of sub-pixels and the second pair of sub-pixels.
7. The solid-state imaging device according to claim 6, wherein the FD section is in a center of a planar shape obtained based on combination of the first pair of sub-pixels and the second pair of sub-pixels.
8. The solid-state imaging device according to claim 7, wherein a center of the FD section is identical with a center of a respective microlens.
9. The solid-state imaging device according to claim 5, wherein
  a signal processing circuit of the plurality of signal processing circuits is shared between a second plurality of pixels, and
  the second plurality of pixels includes at least one of the at least one first pixel or the at least one second pixel.
10. The solid-state imaging device according to claim 5, wherein the respective photoelectric conversion section is inside a semiconductor substrate of the pixel array.
11. The solid-state imaging device according to claim 10, wherein the respective photoelectric conversion section extends inside the semiconductor substrate on a planar region associated with a respective signal processing circuit of the plurality of signal processing circuits.
12. The solid-state imaging device according to claim 5, wherein each signal processing circuit of the plurality of signal processing circuits is around a planar region associated with the respective photoelectric conversion section.
13. The solid-state imaging device according to claim 12, wherein
  each electrode has an identical positional relationship with a respective sub-pixel included in the first pair of sub-pixels and the second pair of sub-pixels.
14. The solid-state imaging device according to claim 5, wherein each of the at least one first pixel and the at least one second pixel includes an identical layout of wiring lines of a respective signal processing circuit of the plurality of signal processing circuits.
15. The solid-state imaging device according to claim 1, wherein each of the at least one first pixel and the at least one second pixel is a green pixel configured to receive green light.
16. An electronic apparatus, comprising:
a solid-state imaging device including:
  a pixel array, wherein
    a plurality of pixels is arrayed in the pixel array,
    each pixel of the plurality of pixels is configured to receive light in a specific wavelength band, at least one first pixel of the plurality of pixels includes a first pair of sub-pixels beneath a first microlens, the first pair of sub-pixels is aligned in a first direction, at least one second pixel of the first plurality of pixels includes a second pair of sub-pixels provided beneath a second microlens, the second pair of sub-pixels is aligned in a second direction, the second direction is perpendicular to the first direction, the plurality of pixels includes a plurality of signal processing circuits, each pixel of the at least one first pixel and the at least one second pixel includes a respective photoelectric conversion section for each sub-pixel included in the first pair of sub-pixels and the second pair of sub-pixels, each electrode of a plurality of electrodes of the plurality of signal processing circuits is around a planar region associated with the respective photoelectric conversion section, and the plurality of electrodes includes a dummy electrode electrically coupled to ground.

* * * * *